US009864079B2

(12) United States Patent
Fujii et al.

(10) Patent No.: US 9,864,079 B2
(45) Date of Patent: Jan. 9, 2018

(54) RADIATION DETECTION DEVICE, RADIATION DETECTION METHOD, AND COMPUTER PROGRAM PRODUCT

(71) Applicant: KABUSHIKI KAISHA TOSHIBA, Tokyo (JP)

(72) Inventors: Keiko Fujii, Tokyo (JP); Go Kawata, Kanagawa (JP); Yasuharu Hosono, Kanagawa (JP); Kazunori Miyazaki, Kanagawa (JP); Rei Hasegawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 152 days.

(21) Appl. No.: 14/963,805

(22) Filed: Dec. 9, 2015

(65) Prior Publication Data

US 2016/0231441 A1 Aug. 11, 2016

(30) Foreign Application Priority Data

Feb. 5, 2015 (JP) .................. 2015-021283

(51) Int. Cl.
*G01T 7/00* (2006.01)
*G01T 1/36* (2006.01)
*G01T 1/20* (2006.01)

(52) U.S. Cl.
CPC ............ *G01T 7/005* (2013.01); *G01T 1/2018* (2013.01); *G01T 1/362* (2013.01)

(58) Field of Classification Search
CPC .................................................. G01T 7/005
See application file for complete search history.

(56) References Cited

U.S. PATENT DOCUMENTS 7,533,267 B2 5/2009 Yoshimura
2005/0201513 A1 9/2005 Nukui et al.
(Continued)

FOREIGN PATENT DOCUMENTS

JP 7-301674 11/1995
JP 2004-48267 2/2004
(Continued)

OTHER PUBLICATIONS

Deprez, K., et al., "A high resolution SPECT detector base on thin continuous LYSO", Institute of Physics and Engineering in Medicine, Physics in Medicine and Biology, Phys. Med. Biol. 59 (2014) p. 153-171.
(Continued)

*Primary Examiner* — David Porta
*Assistant Examiner* — Jeremy S Valentiner
(74) *Attorney, Agent, or Firm* — Finnegan, Henderson, Farabow, Garrett & Dunner, L.L.P.

(57) ABSTRACT

According to an embodiment, a radiation detection device includes a scintillator layer, a plurality of detectors, a setting unit, an identifier, and a corrector. The scintillator layer is configured to convert radiation into scintillation light. The detectors are arranged along a first surface facing the scintillator layer to detect light. The setting unit is configured to set one of the detectors as a first detector to be corrected. The identifier is configured to identify, out of the detectors, a second detector that detects a synchronization signal synchronizing with a first signal detected by the first detector. The corrector is configured to correct an energy spectrum of light detected by the first detector on the basis of a second signal serving as the synchronization signal in signals detected by the second detector, the first signal, and characteristic X-ray energy of a scintillator raw material constituting the scintillator layer.

18 Claims, 13 Drawing Sheets

(56) References Cited

U.S. PATENT DOCUMENTS

| | | | | |
|---|---|---|---|---|
| 2006/0289765 | A1* | 12/2006 | Ikhlef | G01T 1/2018 250/341.5 |
| 2010/0270462 | A1* | 10/2010 | Nelson | G01T 1/2018 250/252.1 |
| 2012/0166128 | A1* | 6/2012 | Ikhlef | A61B 6/583 702/104 |
| 2013/0028382 | A1* | 1/2013 | Spahn | H04N 5/32 378/62 |
| 2013/0193330 | A1* | 8/2013 | Wagadarikar | G01T 1/1648 250/362 |
| 2015/0369929 | A1* | 12/2015 | Durst | G01T 1/2018 250/362 |
| 2015/0374317 | A1* | 12/2015 | Moriyasu | A61B 6/4241 378/5 |

FOREIGN PATENT DOCUMENTS

| | | |
|---|---|---|
| JP | 2004-329574 | 11/2004 |
| JP | 2005-253815 | 9/2005 |

OTHER PUBLICATIONS

Knoll, "Radiation Detection and Measurement, Fourth Edition," Aug. 16, 2010, p. 331.

\* cited by examiner

RADIATION DETECTION DEVICE, RADIATION DETECTION METHOD, AND COMPUTER PROGRAM PRODUCT

CROSS-REFERENCE TO RELATED APPLICATION

This application is based upon and claims the benefit of priority from Japanese Patent Application No. 2015-021283, filed on Feb. 5, 2015; the entire contents of which are incorporated herein by reference.

FIELD

An embodiment described herein relates generally to a radiation detection device, a radiation detection method, and a computer program product.

BACKGROUND

A radiation detection device is disclosed in which a detection element including a plurality of arranged detectors and a scintillator that converts X-rays into scintillation light are combined. A structure of the radiation detection device is disclosed in which a plurality of detectors each having a smaller width are arranged at narrower intervals for the purpose of increasing detection accuracy.

Techniques are disclosed that reduce optical cross talk between detectors. For example, a technique is disclosed in which shielding plates are disposed in regions between detectors. Another technique is disclosed in which a detector that measures an amount of a cross talk noise occurring between detectors is provided separately and data is corrected using the measured amount of the cross talk noise.

When the shielding plates are disposed, the inserted shielding plates make it difficult to reduce the clearances between detectors, thereby making it difficult to increase detection accuracy. When the detector that measures an amount of a cross talk noise is separately provided between detectors, incident radiation on the detector cannot be detected. It is thus difficult for conventional techniques to increase detection accuracy.

DETAILED DESCRIPTION

According to an embodiment, a radiation detection device includes a scintillator layer, a plurality of detectors, a setting unit, an identifier, and a corrector. The scintillator layer is configured to convert radiation into scintillation light. The detectors are arranged along a first surface facing the scintillator layer to detect light. The setting unit is configured to set one of the detectors as a first detector to be corrected. The identifier is configured to identify, out of the detectors, a second detector that detects a synchronization signal synchronizing with a first signal detected by the first detector. The corrector is configured to correct an energy spectrum of light detected by the first detector on the basis of a second signal serving as the synchronization signal in signals detected by the second detector, the first signal, and characteristic X-ray energy of a scintillator raw material constituting the scintillator layer.

The following describes an embodiment in detail with reference to the accompanying drawings.

Figure 1:
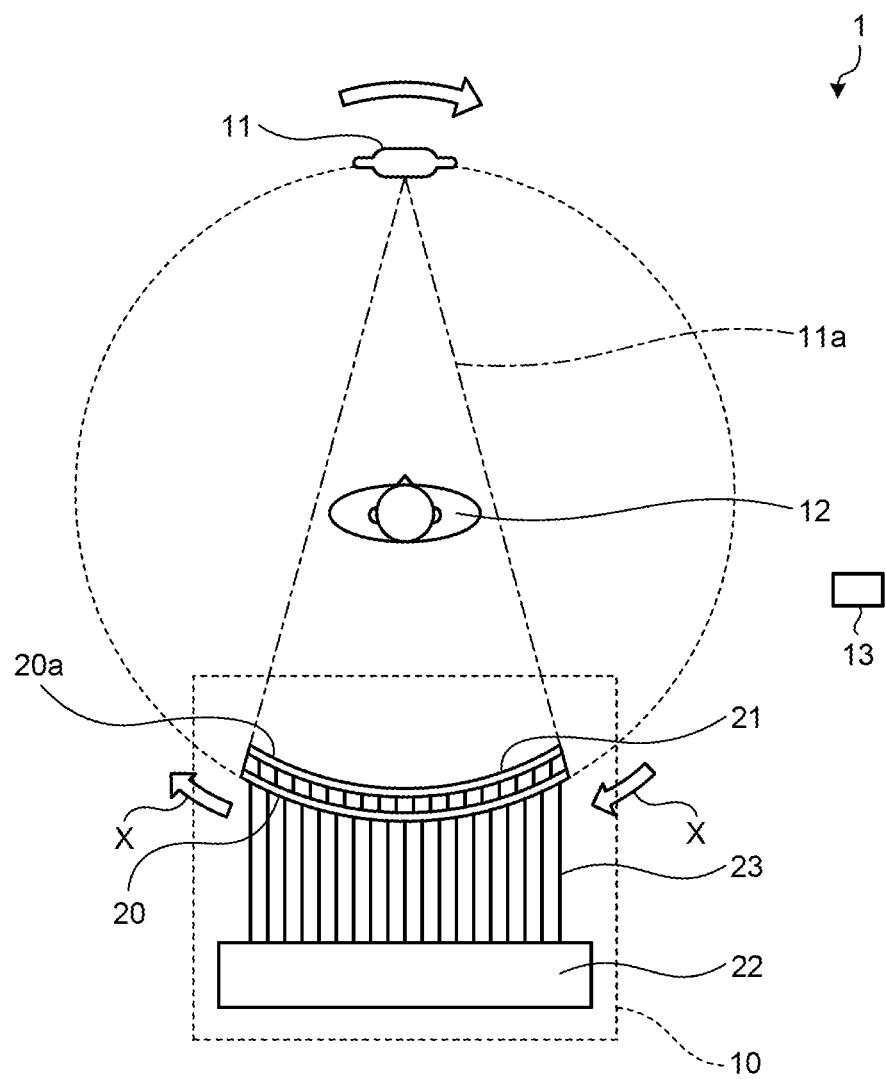
FIG. 1 is a schematic diagram illustrating an example of an inspection apparatus.

FIG. 1 is a schematic diagram illustrating an example of an inspection apparatus 1 in the embodiment.

The inspection apparatus 1 includes a light source 11, a radiation detection device 10, and a driver 13. The light source 11 and the driver 13 are electrically coupled to the radiation detection device 10.

The light source 11 and the radiation detection device 10 are arranged opposite to each other with a distance therebetween. An object 12 is disposed between the radiation detection device 10 and the light source 11. The light source 11 and the radiation detection device 10 are provided in such a manner that they can rotate around the object 12 while the state in which they are arranged opposite to each other is maintained.

The light source 11 emits radiation 11a such as X-rays toward the opposed radiation detection device 10. The radiation 11a emitted from the light source 11 passes through the object 12 and enters the radiation detection device 10.

The radiation detection device 10 detects light. The radiation detection device 10 includes a plurality of detectors 20 and a controller 22. The detectors 20 and the controller 22 are electrically coupled with signal lines 23. The detectors 20 included in the radiation detection device 10 are arranged along a rotation direction (the arrow X direction in FIG. 1) of the radiation detection device 10 in the embodiment.

The detectors 20 receive the radiation 11a that is emitted from the light source 11 and transmitted through the object 12 on an incident surface 20a via a collimator 21. The collimator 21 is disposed on a side adjacent to the incident surface 20a of the detectors 20 and prevents scattered rays from entering the detectors 20.

The detectors 20 each detect received light. The detectors 20 output signals according to detected light to the controller 22 through the signal lines 23. The controller 22 controls the whole of the inspection apparatus 1. The controller 22 receives the signals from the detectors 20.

In the embodiment, the controller 22 calculates, from current values (energy corresponding wave heights of the signals) of the acquired signals (photocurrents), an energy spectrum in which the numbers of photons are represented in association with energy of the radiation 11a entering the respective detectors 20. The controller 22 produces an image of a projection cross section of the object 12 from the energy spectrum of the radiation 11a entering the respective detectors 20.

The driver 13 rotates the light source 11 and the radiation detection device 10 around the object 12 disposed between the light source 11 and the radiation detection device 10 while maintaining their arrangement opposite to each other. As a result, the inspection apparatus 1 can produce an image of the projection cross section of the object 12.

The object 12 is not limited to a human body. The object 12 may be an animal, a plant, or non-living materials such as goods. The inspection apparatus 1 is applicable not only to acquire cross-sectional images of human bodies, animals, and plants but also applicable to be used as various inspection apparatuses such as security apparatuses for radioscopic inspection of the insides of goods.

Figure 2A:
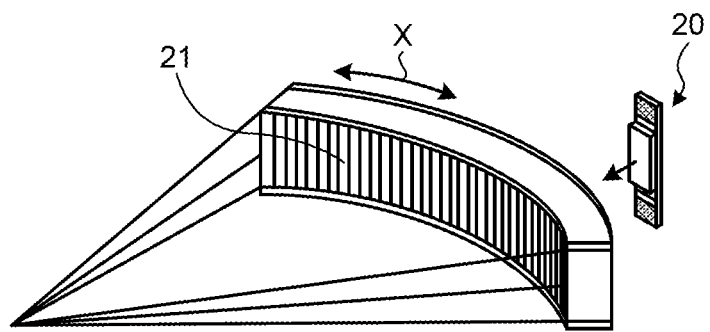
FIGS. 2A and 2B are explanatory views of a detector.
Figure 2B:
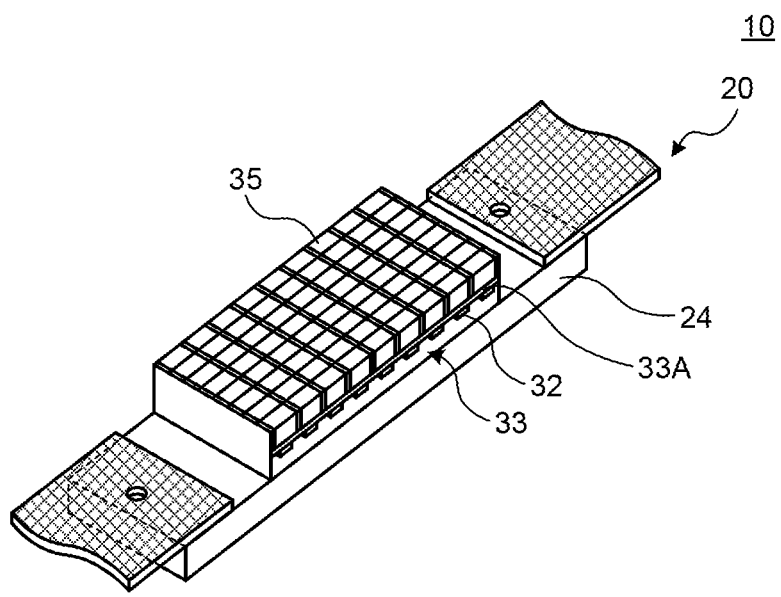

FIGS. 2A and 2B are explanatory views of the detector 20. FIG. 2A is a schematic diagram illustrating an arrangement of the detectors 20. The detectors 20 are arranged along the rotation direction (refer to arrow X in FIG. 2A) of the detectors 20 in a substantially arc-like shape.

FIG. 2B is a schematic diagram of the detector 20. The detector 20 includes a supporting substrate 24, a detector array 33 on the supporting substrate 24, and a scintillator layer 35 above the detector array 33.

The scintillator layer 35 converts incident radiation such as X-rays into photons of scintillation light. A material used for the scintillator layer 35 (a raw material of the scintillator layer 35) is appropriately selected in accordance with an object to which the radiation detection device 10 is applied. The scintillator layer 35 is structured with a material such as gadolinium oxysulfide (GOS), lutetium oxyorthosilicate (LSO), or lutetium-yttrium oxyorthosilicate (LYSO), or a material part of the material described above is substituted with another element, for example. The material is, however, not limited to the examples described above.

The detector array 33 detects scintillation light converted by the scintillator layer 35. The detector array 33 is composed of the arranged detectors 32.

The detector 32 is a silicon photo multiplier (SiPM), for example. In the detector array 33, the detectors 32 serving as the SiPMs are arranged, for example.

The detectors 32 are arranged along a first surface 33A, which serves as a counter surface facing the scintillator layer 35. In the embodiment, the radiation detection device 10 includes the scintillator layer 35 on the light incident side of the detector array 33.

Figure 3:
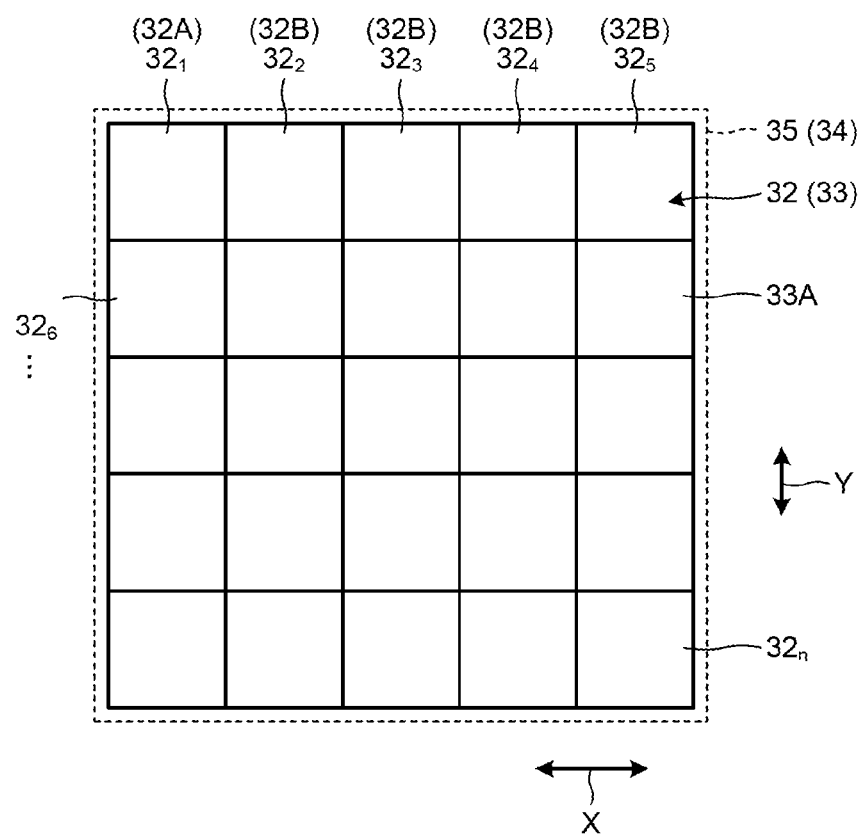
FIG. 3 is a schematic diagram illustrating an example of an arrangement of detectors.

FIG. 3 is a schematic diagram illustrating an example of the arrangement of the detectors 32. As illustrated in FIG. 3, the detectors (detectors $32_1$ to $32_n$, n is an integer equal to or larger than two) are arranged in a matrix along the first surface 33A (refer to the arrow X direction and the arrow Y direction in FIG. 3).

FIG. 3 illustrates an arrangement of 25 (5×5) detectors 32. FIG. 3 illustrates an example. The number of detectors 32 included in the radiation detection device 10 is not limited to 25.

Figure 4:
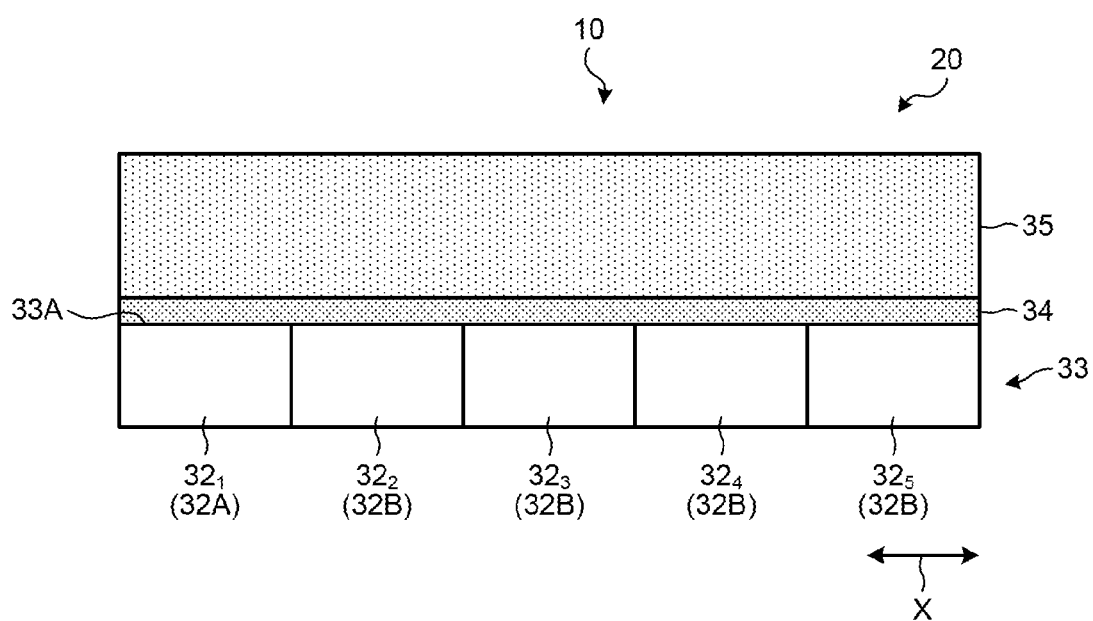
FIG. 4 is a cross-section diagram of the detector.

FIG. 4 is a cross-section diagram of the detector 20. As illustrated in FIG. 4, the detector array 33 is composed of the detectors 32 arranged along the first surface 33A facing the scintillator layer 35. FIG. 4 illustrates a single row of detectors $32_1$ to $32_5$ arranged in the arrow X direction in the detector array 33 as an example.

An adhesive layer 34 is provided between the scintillator layer 35 and the detector array 33. The adhesive layer 34 adhesively bonds the scintillator layer 35 and the detector array 33. The adhesive layer 34 has a light transmission property that allows scintillation light to pass through the adhesive layer 34 from the scintillator layer 35 side to the detector array 33 side.

A reflecting member may be provided to the scintillator layer 35 in a region corresponding to areas between the detectors 32. Any member that reflects scintillation light (photons) converted by the scintillator layer 35 may be used as the reflecting member.

Figure 5:
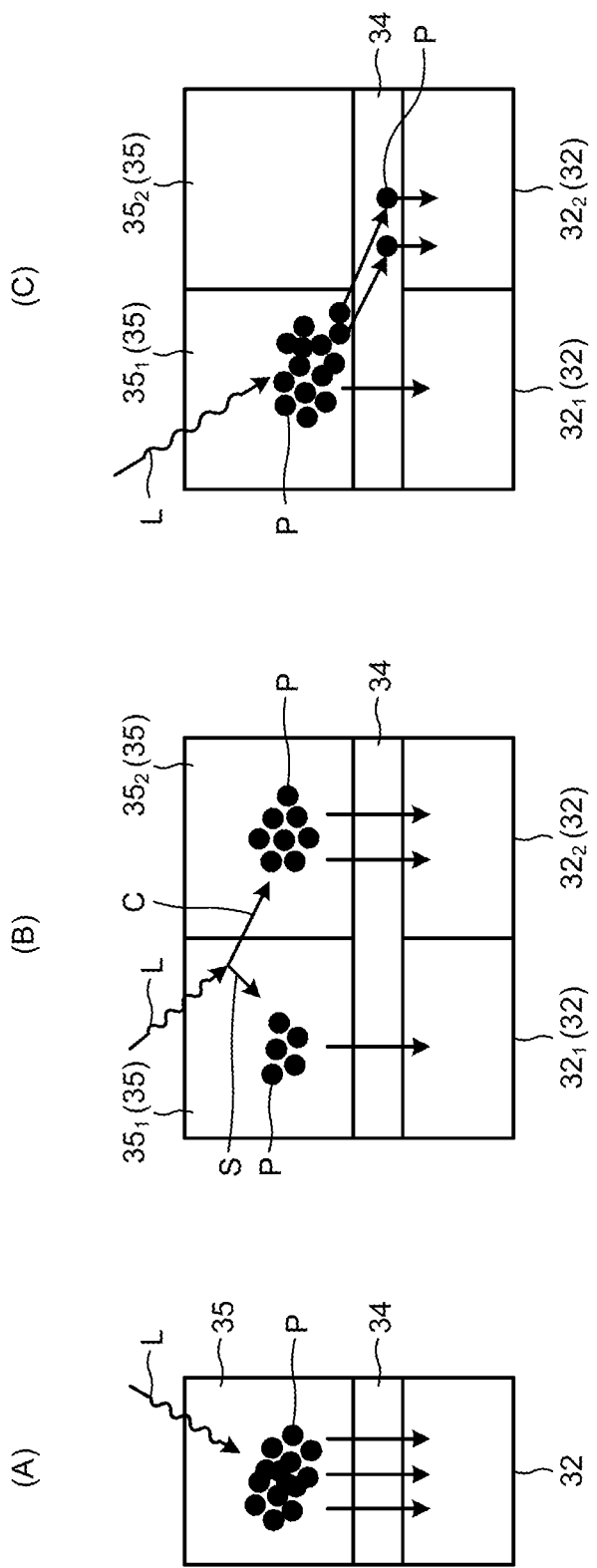
FIG. 5 illustrates propagation of photons.

Between the detectors 32, optical cross talk sometimes occurs. FIG. 5 illustrates propagation of photons P of scintillation light converted by the scintillator layer 35.

As illustrated in FIG. 5, the scintillator layer 35 converts radiation L entering the scintillator layer 35 into the photons P of scintillation light. It is assumed that all of the photons P generated in regions corresponding to the respective detectors 32 in the scintillator layer 35 reach the corresponding detectors 32, as illustrated in (A) in FIG. 5.

In this case, the respective detectors 32 can accurately measure the number of photons P generated in the regions corresponding to the respective detectors 32 in the scintillator layer 35.

The region corresponding to the detector 32 in the scintillator layer 35 is the region that continues in the scintillator layer 35 via the adhesive layer 34 from the detectors 32 in a thickness direction. The thickness direction is the direction along the thickness of the detector 32 and is perpendicular to the arrangement direction of the detectors 32 in the scintillator layer 35.

A case sometimes occurs as illustrated in (B) in FIG. 5, in which scintillation light S, which is generated by radiation L entering a region $35_1$ corresponding to the detector $32_1$ in the scintillator layer 35, propagates in the scintillator layer 35, and reaches a region $35_2$ corresponding to another detector 32 (e.g., the detector $32_2$) in the scintillator layer 35. In this case, characteristic X-rays C that should be detected by the detector $32_1$ is detected by another detector 32 (e.g., the detector $32_2$). As a result, the detector $32_1$ detects a signal including optical cross talk.

A case sometimes occurs as illustrated in (C) in FIG. 5, in which scintillation light, which is generated by radiation L entering the region $35_1$ corresponding to the detector $32_1$ in the scintillator layer 35, propagates in the adhesive layer 34, and reaches another detector 32 (e.g., the detector $32_2$). In this case, part of scintillation light that should be detected by the detector $32_1$ is detected by another detector 32 (e.g., the detector $32_2$). As a result, the detector $32_1$ detects a signal including optical cross talk also in the case where scintillation light propagates in the adhesive layer 34.

To address such cases, the controller 22 of the radiation detection device 10 in the embodiment corrects the energy spectrum.

Figure 6:
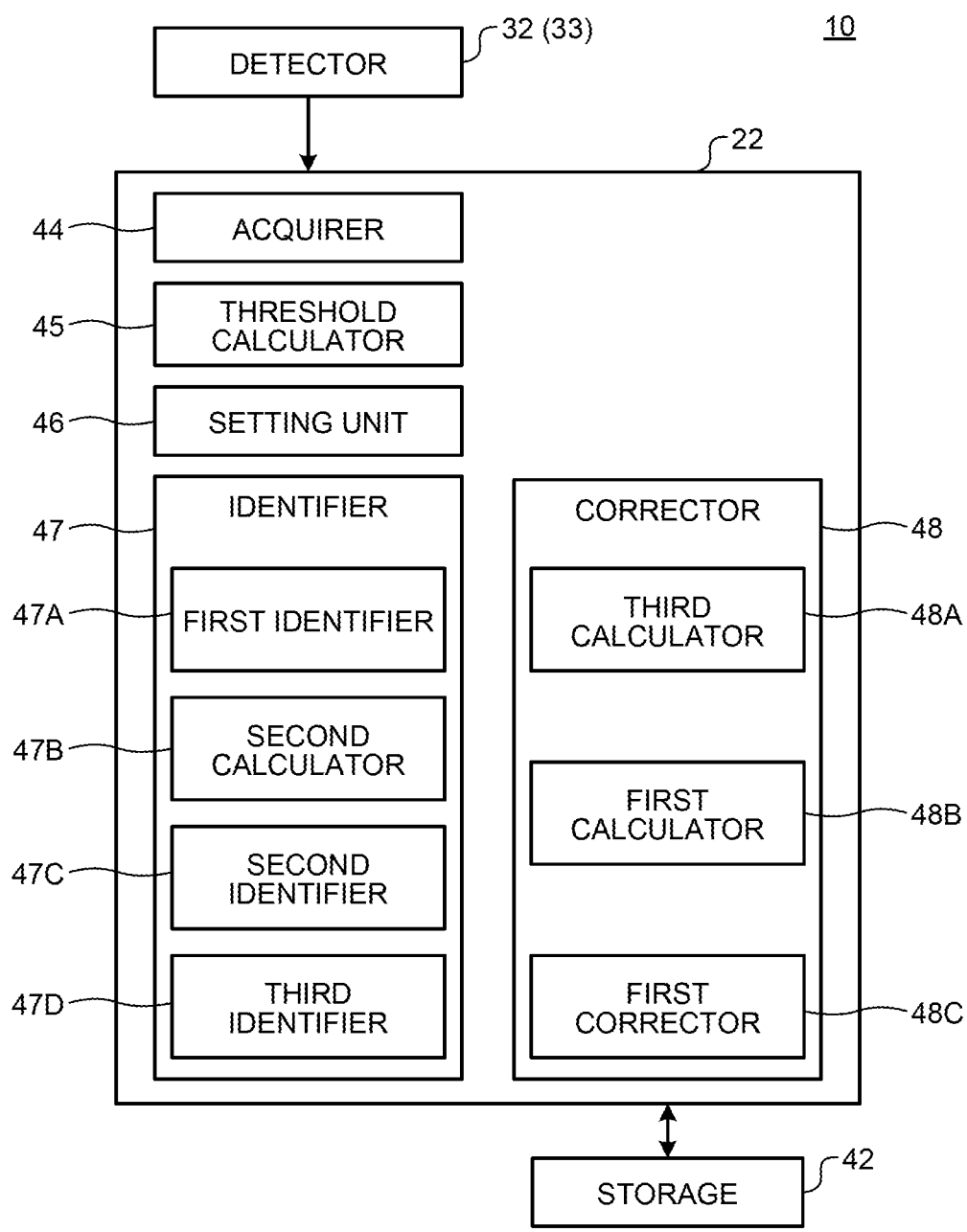
FIG. 6 is a block diagram illustrating a functional structure of a radiation detection device.

FIG. 6 is a block diagram illustrating a functional structure of the radiation detection device 10 in the embodiment.

The radiation detection device 10 includes the detector array 33, the controller 22, and a storage 42. The controller 22 performs control on each detector 32 included in the detector array 33. The controller 22 is provided in such a manner that one controller 22 corresponds to one detector 32 (i.e., in one-to-one relation). The detectors 32, the storage 42, and the controller 22 are connected so as to enable the exchange of data and signals among them. The storage 42 stores therein various types of data.

The controller 22 controls the whole of the radiation detection device 10. The controller 22 is a computer including a central processing unit (CPU). The controller 22 may be a circuit other than the CPU.

The controller 22 includes an acquirer 44, a threshold calculator 45, a setting unit 46, an identifier 47, and a corrector 48. The identifier 47 includes a first identifier 47A, a second calculator 47B, a second identifier 47C, and a third identifier 47D. The corrector 48 includes a third calculator 48A, a first calculator 48B, and a first corrector 48C.

A part or all of the acquirer 44, the threshold calculator 45, the setting unit 46, the identifier 47, the first identifier 47A, the second calculator 47B, the second identifier 47C, the third identifier 47D, the corrector 48, the third calculator 48A, the first calculator 48B, and the first corrector 48C may be achieved by causing a processing unit such as a CPU to execute a program, i.e., by software, by hardware such as an integrated circuit (IC), or by software and hardware together with each other.

The acquirer 44 acquires signals detected by the respective detectors 32 included in the detector array 33. The signals are represented by waveforms that indicate the wave heights corresponding to energy of scintillation light (photons P) detected by the respective detectors 32. The acquirer 44 sequentially stores acquired signals in the storage 42 in association with identification information about the respective detectors 32 each detecting the corresponding signal and respective detection times. In the following description, energy of scintillation light is simply described as energy.

The threshold calculator 45 calculates, for each detector 32, a second threshold Vth and a first threshold Eth.

The second threshold Vth is a threshold of the wave height of the signal. The second threshold Vth is used as a threshold to discriminate a noise in the signal detected by each detector 32. The controller 22 adopts a signal having a wave height equal to or larger than the second threshold Vth corresponding to each detector 32 as the signal after noise discrimination from the signal detected by each detector 32.

The threshold calculator 45 obtains the wave height that can discriminate a noise and a signal as the second threshold Vth. The second threshold Vth is obtained by the following procedure.

Measurements are preliminarily performed by changing the number of incident photons in various numbers for being used as correction data for the detector 32. The wave heights of the signals that are detected by the detector 32 and acquired by the acquirer 44 are stored without setting a threshold. The threshold calculator 45 converts the stored wave heights into energy and thereafter performs computing processing. By the computing processing, the threshold calculator 45 obtains an energy histogram for each of the measurements performed under the respective numbers of incident photons. The threshold calculator 45 obtains an energy threshold Esig such that when the energy threshold Esig is set as a common energy threshold of the detector array 33 (i.e., as an energy threshold in common with all of the detectors 32) for each of the produced energy histograms, the number of detected photons equal to or larger than the threshold keep linearity with respect to the number of incident photons in each of the measurements. The threshold calculator 45 obtains, for each detector 32, the wave height that is one before energy conversion and corresponds to the energy threshold Esig and sets the obtained wave height as the second threshold Vth.

The first threshold Eth indicates the upper limit value of energy for determination of cross talk.

The value of energy of scintillation light, which propagates from one detector 32 side corresponding to the region in the scintillator layer 35 that the radiation L enters to into the scintillator layer 35 and the adhesive layer 34 on another detector 32 side, is sufficiently smaller than the value of energy of characteristic X-rays.

Figure 7:
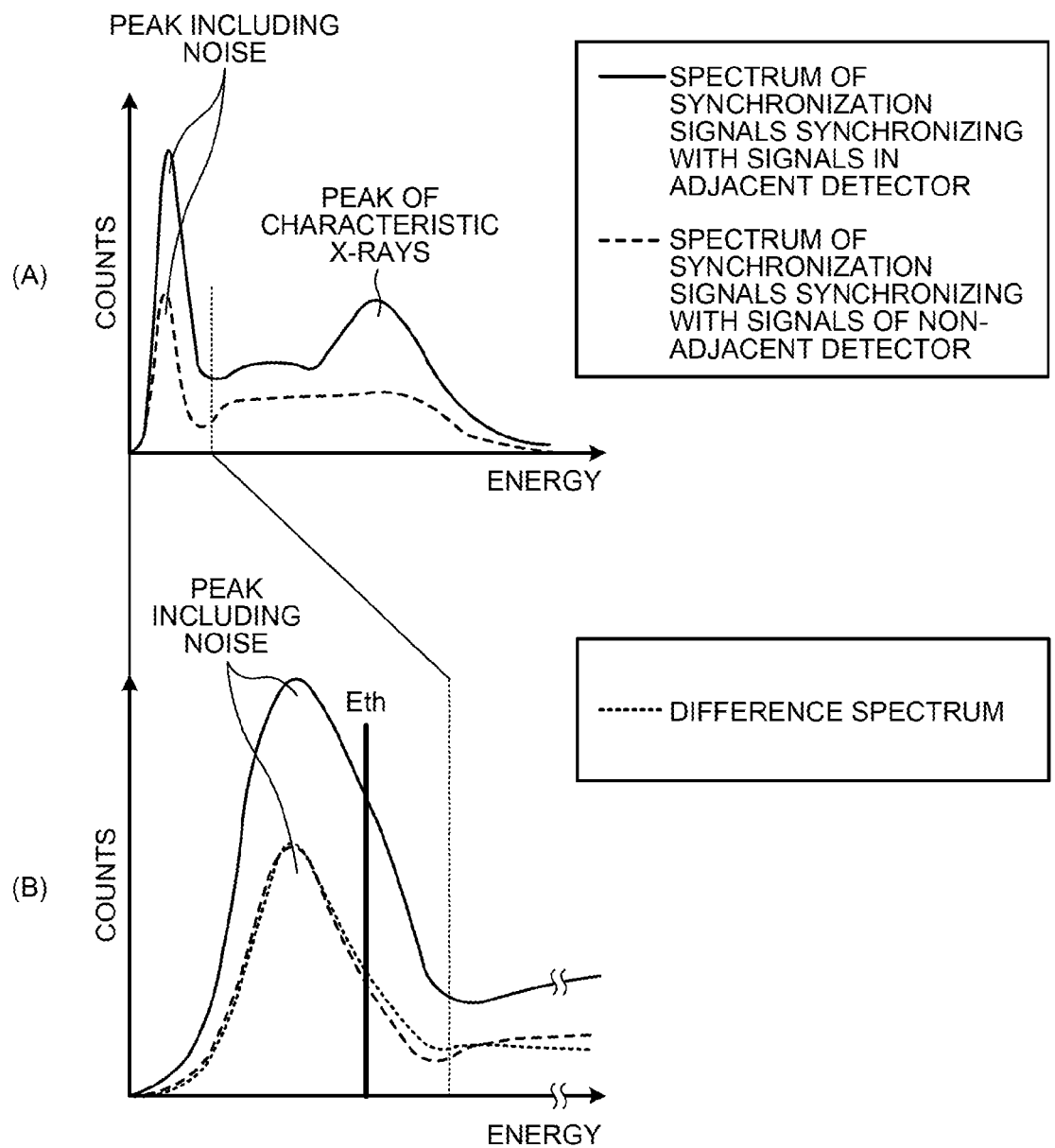
FIG. 7 illustrates of energy spectra.

The threshold calculator 45 calculates, for each detector 32 provided in the detector array 33, a spectrum on a low energy side of signals synchronizing with signals in the adjacent detector 32 and a spectrum on a low energy side of signals synchronizing with signals in a non-adjacent detector 32. FIG. 7 illustrates the spectra. The low energy side indicates an energy area from the peak including noise to its skirts of the energy spectrum of the synchronization signals (refer to (A) in FIG. 7). The synchronization signals are described in detail later.

The threshold calculator 45 obtains, for each detector 32, a difference spectrum obtained by subtracting the spectrum on the low energy side of the signals synchronizing with signals in the non-adjacent detector 32 from the spectrum on the low energy side of the signals synchronizing with signals in the adjacent detector 32, which spectra are calculated for each detector 32.

As illustrated in (B) in FIG. 7, the threshold calculator 45 calculates, for each detector 32, energy corresponding to the higher value at half counts of the peak in the difference spectrum as the first threshold Eth.

In the embodiment, it is assumed that no signals accidentally synchronizing with each other are included in the difference spectrum. It is deemed that the probability of occurrence of synchronization signal having low energy is high in a range equal to or smaller than the first threshold Eth corresponding to each detector 32.

The threshold calculator 45 stores the first threshold Eth and the second threshold Vth, which are calculated for each detector 32, in the storage 42 in association with the identification information about each detector 32.

The setting unit 46 sets a first detector serving as a correction target out of the detectors 32. The storage 42 sequentially sets the detectors 32 provided in the detector array 33 one by one as the correction target. The setting unit 46 sequentially sets the detectors 32 on which correction processing, which is described later, is not performed by the corrector 48 one by one as the first detector serving as the correction target out of the detectors 32 provided in the detector array 33.

For example, the setting unit 46 sets the detector $32_1$ as a first detector 32A out of the detectors 32 (refer to FIGS. 3 and 4). The setting unit 46 sequentially sets the detectors $32_2$ to $32_n$ as the first detector 32A.

The identifier 47 identifies a second detector 32B that detects a synchronization signal synchronizing with a first signal detected by the first detector 32A set as the correction target, out of the detectors 32 provided in the detector array 33. The second detector 32B is the detector 32 that detects the synchronization signal synchronizing with the first signal and is not the detector 32 set as the first detector 32A serving as the correction target, out of the detectors 32 provided in the detector array 33.

The synchronization signal synchronizing with the first signal, which synchronization signal is a second signal, is detected within a certain time from the detection of the first signal. The synchronization signal means signals detected from each other within a certain time out of the signals detected by a certain detector 32 and the signals detected by another detector 32.

The first signal is, thus, the synchronization signal synchronizing with the second signal out of the signals detected by the first detector 32A.

The identifier 47 calculates the certain time used for determination of the synchronization signals in the following manner and uses it for identification.

A time difference Δt in detection time between signals deemed as the synchronization signals depends on a time constant of the scintillator layer 35 provided in the radiation detection device 10. The identifier 47 calculates the certain time used for determination of synchronization signals using a time difference distribution map.

Figure 8:
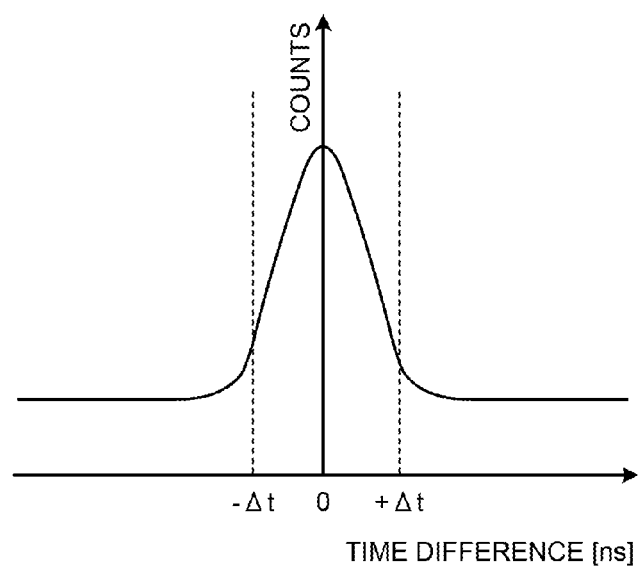
FIG. 8 is a schematic diagram illustrating an example of a time difference distribution map.

FIG. 8 is a schematic diagram illustrating an example of the time difference distribution map.

For example, the identifier 47 extracts signals having a wave height equal to or larger than the second threshold Vth corresponding to the first detector 32A out of the signals detected by the first detector 32A serving as the correction target. Likewise, the identifier 47 extracts, out of the signals detected by another detector 32 adjacent to the first detector 32A, signals having a wave height equal to or larger than the second threshold Vth corresponding to the adjacent detector 32.

The identifier 47 creates the time difference distribution map that represents a distribution of the number of signals corresponding to a difference in detection time between the first detector 32A and the detector 32 adjacent to the first detector 32A from the extracted signals. The time range of the time difference is a time approximately four times larger than the time constant, for example. As illustrated in FIG. 8, the time difference distribution map has a peak of the number of signals at zero of time difference Δt. The identifier 47 calculates a time difference range that includes approximately 95% of the area of both sides of the peak of the number of signals as a certain time used for determination of the synchronization signals. The certain time is ±48 ns, for example.

The identifier 47 calculates a certain time used for the determination of synchronization signals from the signals detected by the first detector 32A set as the correction target and the signals detected by another detector 32 adjacent to the first detector 32A. The calculated certain time is used for the determination of the synchronization signals between the first detector 32A and each of the detectors 32 other than the first detector 32A.

The identifier 47 may calculate the certain time used for the determination of the synchronization signals between the first detector 32A set as the correction target and each of the other detectors 32.

The identifier 47 stores the calculated certain time in the storage 42 and uses it for identifying the detectors 32 that detect the synchronization signals.

Figure 9:
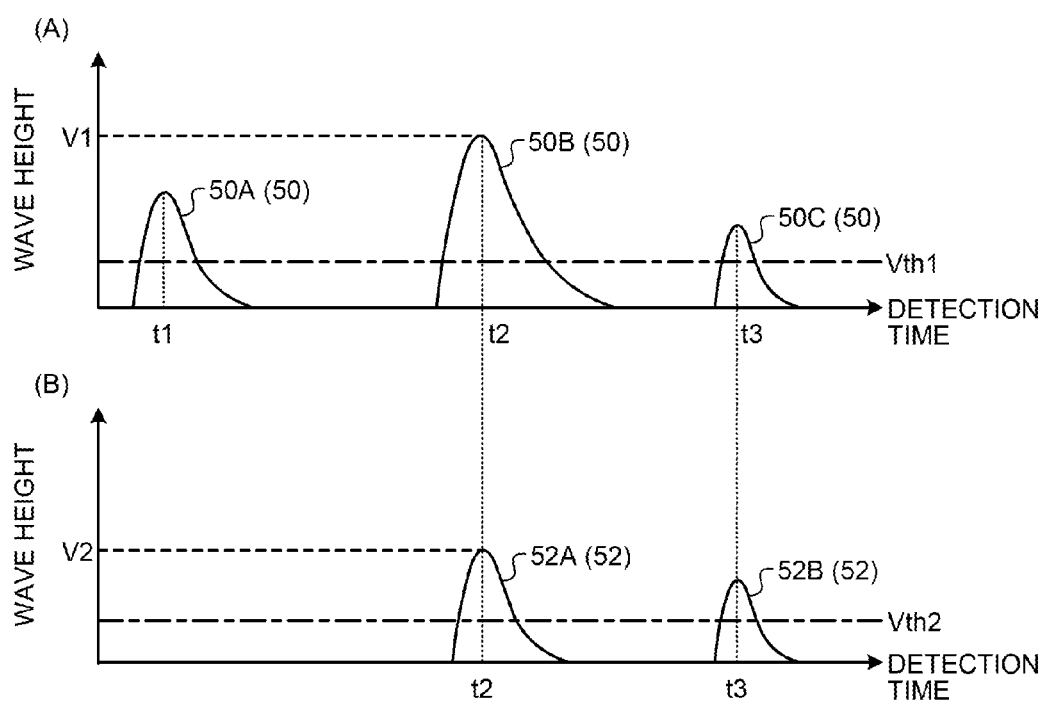
FIG. 9 illustrates detected signals.

FIG. 9 illustrates signals detected by the respective detectors 32.

In FIG. 9, (A) is a schematic diagram illustrating an example of a signal 50 detected by the first detector 32A serving as the correction target; and (B) is a schematic diagram illustrating an example of a signal 52 detected by a detector 32 (e.g., another detector 32 adjacent to the first detector 32A) other than the first detector 32A.

The identifier 47 identifies, as the signals serving as the correction targets for each of the detectors 32, signals having a wave height equal to or larger than the second threshold Vth corresponding to the detector 32 out of the signals detected by the detector 32. In the example illustrated in FIG. 9, the identifier 47 identifies signals 50A, 50B, and 50C having a wave height equal to or larger than a second threshold Vth1 corresponding to the first detector 32A in the signal 50 detected by the first detector 32A. The identifier 47 also identifies signals 52A and 52B having a wave height equal to or larger than a second threshold Vth2 corresponding to the detector 32 in the signal 52 detected by the detector 32 other than the first detector 32A.

In the example illustrated in FIG. 9, the signal 52A is detected within a certain time from the detection time of the signal 50B in the signals 50 and 52. The signal 52B is detected within a certain time from the detection time of the signal 50C. Thus, in the example illustrated in FIG. 9, the identifier 47 identifies, as the first signals, the respective signals 50B and 50C in the signal 50 detected by the first detector 32A. The identifier 47 also identifies the signal 52A as the second signal that synchronizes with the signal 50B serving as the first signal and the signal 52B as the second signal that synchronizes with the signal 50C serving as the first signal in the signal 52 detected by the other detector 32.

In the example illustrated in FIG. 9, the identifier 47 identifies the signal 50B as the first signal and the signal 52A synchronizing with the signal 50 as the second signal. The identifier 47 also identifies the signal 50C as the first signal and the signal 52B synchronizing with the signal 50C as the second signal. In this case, the identifier 47 identifies two synchronization signal pairs.

The identifier 47 performs processing in the same manner as described above on all of the detectors 32 provided in the detector array 33, and identifies the detectors 32 that detect the second signals synchronizing with the first signals detected by the first detector 32A.

The identifier 47 includes the first identifier 47A, the second calculator 47B, the second identifier 47C, and the third identifier 47D.

The first identifier 47A identifies a first group of the second detectors 32B out of the detectors 32. The second detectors 32B belonging to the first group are the detectors 32 that detect the synchronization signals synchronizing with the first signals detected by the first detector 32A serving as the correction target.

The first identifier 47A identifies, out of the other detectors 32 other than the first detector 32A serving as the correction target, the detectors 32 that detect the second signals serving as the synchronization signals synchronizing with the signals detected by the detector 32 as the second detectors 32B belonging to the first group.

The second calculator 47B calculates, for each of the second detectors belonging to the first group, a proportion of the second signals synchronizing with the first signals to all of the detected signals.

In the example illustrated in FIG. 9, it is assumed that one of the second detectors 32b belonging to the first group detects the signal 52 illustrated in (B). In this case, the second detector 32B detects two synchronization signals of the second signal 52A synchronizing with the first signal (signal 50B) in the first detector 32A and the second signal 52B synchronizing with the first signal (signal 50C). It is assumed that the second detector 32B actually detects four signals 52, which are two additional signals 52 besides the signals 52A and 52B.

In this case, the second calculator 47B calculates 50% (2/4) as the proportion of the second signals detected by the second detector 32B belonging to the first group.

Figure 10:
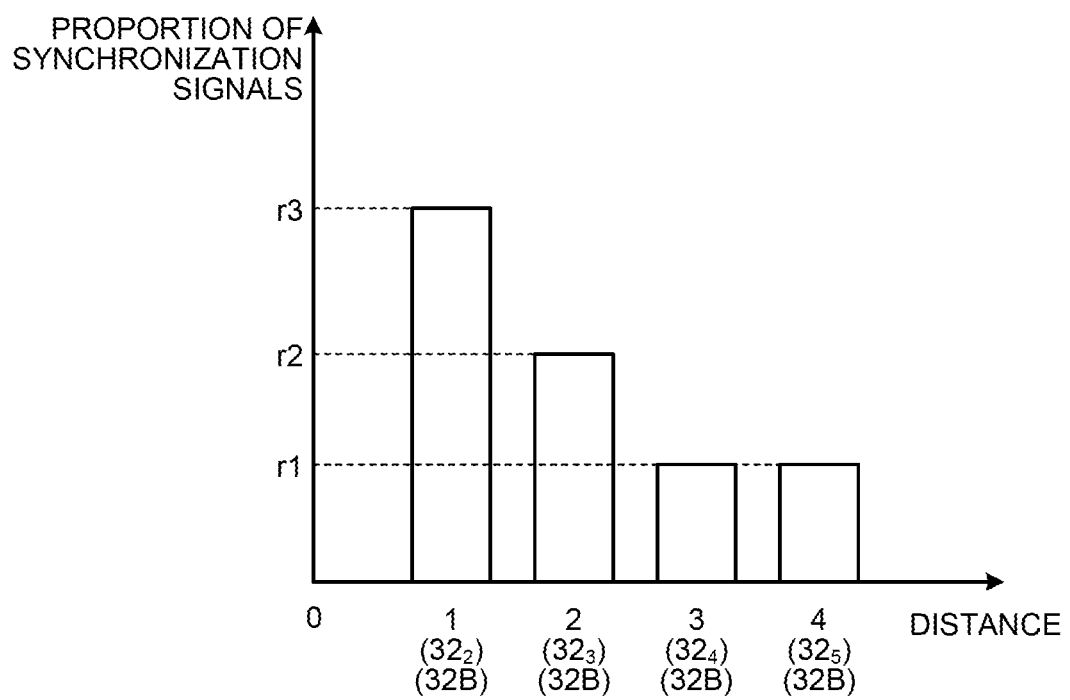
FIG. 10 is a schematic diagram illustrating an example of a corresponding relation between a distance from a first detector serving as a correction target and a proportion of the number of second signals synchronizing with signals of the first detector.

FIG. 10 is a schematic diagram illustrating an example of a corresponding relation between the distance from the first detector 32A serving as the correction target and the proportion of the number of second signals synchronizing with signals of the first detector 32A.

In FIG. 10, distance 1 indicates the second detector 32B (e.g., the detector $32_2$ in FIG. 3) adjacent to the first detector 32A serving as the correction target (e.g., the detector $32_1$ in FIG. 3). In FIG. 10, distance 2 indicates the second detector 32B (e.g., the detector $32_3$ in FIG. 3) in the second position from the first detector 32A serving as the correction target (e.g., the detector $32_1$ in FIG. 3). In FIG. 10, distance 3 indicates the second detector 32B (e.g., the detector $32_4$ in FIG. 3) in the third position from the first detector 32A serving as the correction target (e.g., the detector $32_1$ in FIG. 3). In FIG. 10, distance 4 indicates the second detector 32B (e.g., the detector $32_5$ in FIG. 3) in the fourth position from the first detector 32A serving as the correction target (e.g., the detector $32_1$ in FIG. 3).

In FIG. 10, r1 indicates the proportion of the identified second signals synchronizing with signals of the first detector 32A in the second detector 32B (detector $32_4$) at distance 3 and the detector 32 (detector $32_5$) at distance 4. In FIG. 10, r2 indicates the proportion of the identified second signals synchronizing with signals of the first detector 32A in the second detector 32B (detector $32_3$) at distance 2. In FIG. 10, r3 indicates the proportion of the identified second signals synchronizing with signals of the first detector 32A in the second detector 32B (detector $32_2$) at distance 1.

Referring back to FIG. 6, the second identifier 47C identifies, out of the second detectors 32B belonging to the first group, the second detectors 32B belonging to a second group.

The second detectors 32B belonging to the second group are the first detectors 32B in each of which the reduction in proportion of the second signals is saturated, out of the second detector 32B belonging to the first group. The proportions of the second signals detected by the respective second detectors 32B arranged in a direction apart from the location adjacent to the first detector 32A are reduced and saturated.

When the corresponding relation illustrated in FIG. 10 is obtained, the proportion of the second signals is reduced as the distance from the first detector 32A (detector $32_1$) increases, and the reduction in proportion is saturated to proportion r1 in the second detector 32B (detector $32_4$) at distance 3 and in the second detector 32B (detector $32_5$) at distance 4.

In this case, the second identifier 47C, thus, identifies the detectors $32_4$ and $32_5$ as the first detectors 32B belonging to the second group out of the second detectors 32B belonging to the first group (e.g., the detectors $32_2$ to $32_5$).

Referring back to FIG. 6, the third identifier 47D identifies, out of the second detectors 32B belonging to the first group, the second detectors 32B that do not belong to the second group as the detectors 32 used for correction of the first signals. In the following description, the second detectors 32B identified by the identifier 47 are described as the second detectors 32B belonging to a third group in some cases.

When the corresponding relation illustrated in FIG. 10 is obtained, the third identifier 47D identifies, out of the second detectors 32B (detectors $32_2$ to $32_5$) belonging to the first group, the second detectors 32B (detectors $32_2$ and $32_3$) other than the second detectors 32B (detectors $32_4$ and $32_5$) belonging to the second group as the detectors 32 used for the correction of the first signals of the first detector 32A (detector $32_1$).

Figure 11:
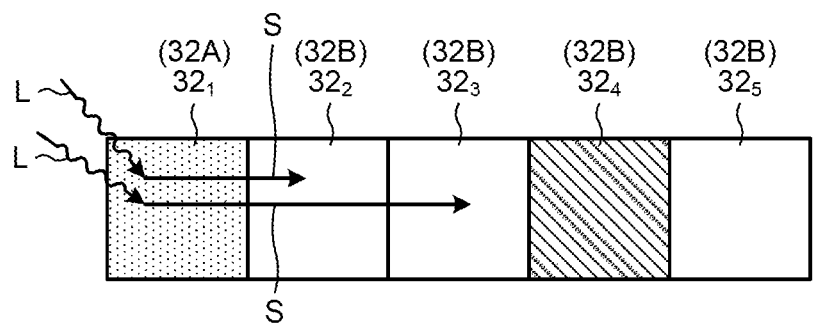
FIG. 11 is a schematic diagram illustrating the detectors.

FIG. 11 is a schematic diagram illustrating one row of the detectors 32 (detectors $32_1$ to $32_5$) along the arrow X direction (refer to FIG. 3) in the detector array 33.

It is assumed that the setting unit 46 sets the detector $32_1$ to the first detector 32A serving as the correction target. It is assumed that the second identifier 47C identifies the detectors $32_4$ and $32_5$, in each of which the reduction in proportion of the second signals is saturated, as the second detectors 32b belonging to the second group. It is assumed that the third identifier 47D identifies, out of the second detectors 32B (detectors $32_2$ to $32_5$) belonging to the first group, the second detectors 32B (detectors $32_2$ and $32_3$) other than the second detectors 32B (detectors $32_4$ and $32_5$) belonging to the second group.

In this case, the second identifier 47C identifies the detectors $32_2$ and $32_3$ as the second detectors 32B belonging to the third group. The third identifier 47D, thus, identifies the detectors $32_2$ and $32_3$ as the second detectors 32B that detect part of scintillation light that should be detected by the first detector 32A (detector $32_1$).

The detectors $32_4$ and $32_5$ belonging to the second group are identified as the detectors 32 that scintillation light to be detected by the first detector 32A (detector $32_1$) does not reach.

Referring back to FIG. 6, the corrector 48 corrects an energy spectrum of light detected by the first detector 32A on the basis of the second signals serving as the synchronization signals synchronizing with the first signals out of the signals detected by the second detectors 32B, the first signals, and the characteristic X-ray energy of a scintillator raw material of the scintillator layer 35.

In the embodiment, the corrector 48 corrects the energy spectrum of light detected by the first detector 32A on the basis of the second signals out of the signals detected by the second detectors 32B identified by the third identifier 47D, the first signals of the first detector 32A serving as the correction target, and the characteristic X-ray energy of the scintillator raw material.

The characteristic X-ray energy of the scintillator raw material of the scintillator layer 35 may be preliminarily stored in the storage 42.

When the scintillator raw material of the scintillator layer 35 is LYSO, the characteristic X-ray energy $Ex \pm \Delta E$ is $54 \pm 15$ keV, for example.

Here, $\pm \Delta E$ represents energy resolution observed by the detector 32. In the embodiment, the characteristic X-ray energy of the scintillator raw material of the scintillator layer 35 is represented by the actual characteristic X-ray energy of the scintillator raw material of the scintillator layer 35 plus or minus energy resolution.

The corrector 48 includes the third calculator 48A, the first calculator 48B, and the first corrector 48C.

The third calculator 48A calculates a correction rate. The third calculator 48A calculates the correction rate for each of the second detectors 32B identified by the third identifier 47D. The correction rate is used when the number of synchronization signal pairs actually used for correction out of a plurality of synchronization signal pairs of the first signals of the first detector 32A and the second signals of the second detector 32B is calculated. The correction rate is used in the processing by the first calculator 48B (which is described later in detail).

The third calculator 48A calculates, as the correction rate for each of the second detectors 32B identified by the third identifier 47D, a proportion of a subtraction value to the total number of second signals detected by the second detector 32B. The subtraction value is obtained by subtracting the number of second signals detected by the second detectors 32B belonging to the second group (the number of second signals at the saturation) from the total number of second signals detected by the second detector 32B to the total number of second signals detected by the second detector 32B.

For example, it is assumed that the corresponding relation illustrated in FIG. 10 is obtained. In this case, the third calculator 48A calculates, as the correction rate used for the detector $32_2$ serving as the second detector 32B, the value obtained by dividing the subtraction value obtained by subtracting the number of second signals at the saturation (the number of signals corresponding to proportion r1) from the number of second signals detected by the detector $32_2$ (the number of signals corresponding to proportion r3) by the number of second signals corresponding to proportion r3.

The third calculator 48A may calculate the correction rate in the following manner. For example, the third calculator 48A calculates, for each of the second detectors 32B identified by the third identifier 47D, the total number of second signals indicating second energy equal to the characteristic X-ray energy out of the second signals detected by the second detector 32B. The third calculator 48A calculates, as the correction rate, the proportion of the subtraction value obtained by subtracting the number of second signals that indicate the second energy equal to the characteristic X-ray energy and are detected by the second detectors 32b belonging to the second group from the calculated total number.

As for the correction rate for the detector $32_2$ in an energy area equal to or smaller than the first threshold Eth, the correction rate calculated in relation to the characteristic X-ray area is adopted. When the value of the correction rate needs to be individually calculated or optimized, the correction rate may be used that is calculated according to the following procedure. In this case, the correction rate for the detector $32_2$ in the energy area equal to or smaller than the first threshold Eth is set to a value obtained by dividing the number of second signals detected by the detector $32_2$ in the energy area equal to or smaller than the first threshold Eth and a subtraction value by the number of second signals detected by the detector $32_2$ in the energy area equal to or smaller than the first threshold Eth.

Likewise, the third calculator 48A calculates the correction rate for each of the second detectors 32B identified by the third identifier 47D.

The third calculator 48A, then, stores the identification information about the second detectors 32B identified by the third identifier 47D and the calculated correction rates in the storage 42 in association with each other.

The first calculator 48B calculates the first energy after correction, for each synchronization signal pair of the first signal and the second signal synchronizing with the first signal, on the basis of a magnitude relation among the first energy corresponding to the wave height of the first signal, the second energy corresponding to the wave height of the second signal synchronizing with the first signal, and the characteristic X-ray energy of the scintillator raw material. The first calculator 48B calculates a count number allocated to the calculated first energy when the energy spectrum is calculated.

The first energy and the second energy represent energy of scintillation light, which is expressed by the wave height of the signal.

For example, when the signals illustrated in FIG. 9 are obtained, the signal 50B serving as the first signal and the signal 52A serving as the second signal are the synchronization signal pair while the signal 50C serving as the first signal and the signal 52B serving as the second signal are the synchronization signal pair. It is assumed that the identifier 47 identifies the two synchronization signal pairs, for example.

In this case, on the basis of the magnitude relation among the first energy corresponding to a wave height V1 of the signal 50B (first signal), the second energy corresponding to a wave height V2 of the signal 52A (second signal) synchronizing with the signal 50B, and the characteristic X-ray energy of the scintillator raw material, the first calculator 48B calculates the first energy after correction corresponding to the synchronization signal pair, and the count number to be allocated.

On the basis of the magnitude relation among the first energy corresponding to the wave height of the signal 50C (first signal), the second energy corresponding to the wave height of the signal 52B (second signal) synchronizing with the signal 50C, and the characteristic X-ray energy of the scintillator raw material, the first calculator 48B calculates the first energy after correction corresponding to the synchronization signal pair, and the count number to be allocated.

In this way, the first calculator 48B calculates, for each synchronization signal pair, the first energy after correction and the count number to be allocated.

The following describes the calculation of the first energy after correction by the first calculator 48B in detail.

Let the first energy corresponding to the wave height of the first signal, included in the synchronization signal pair, be Ea. Let the second energy corresponding to the wave height of the second signal, included in the synchronization signal pair, be Eb. Let the first signal after correction be Ec. Let the characteristic X-ray energy of the scintillator raw material be Ex±ΔE. The characteristic X-ray energy of the scintillator raw material has a certain range about the value.

The first calculator 48B calculates the number (M, which is an integer equal to or larger than one) of synchronization signal pairs of the first signals and the second signals for each of the combinations of the first detector 32A serving as the correction target and the respective second detectors 32B belonging to the third group.

The first calculator 48B, then, calculates the number (K, which is an integer equal to or larger than one) of synchronization signals used for correction out of the calculated number M of synchronization signal pairs. The first calculator 48B calculates the multiplication value obtained by multiplying the calculated number M of synchronization signal pairs by the correction rate corresponding to the second detector 32B that detects the second signals included in the synchronization signal pair as the number K of synchronization signal pairs used for correction.

The first calculator 48B randomly selects, for each of the combinations of the first detector 32A serving as the correction target and the respective second detectors 32B belonging to the third group, synchronization signal pairs the number of which is the multiplication value (the number K of synchronization signal pairs used for correction) calculated for each of the combinations.

The first calculator 48B determines K synchronization signal pairs used for correction by randomly selecting K synchronization signal pairs out of M synchronization signal pairs. The reason why K synchronization signal pairs are randomly determined is that it is unclear which one of the M synchronization signal pairs includes the second signal actually synchronizing with the first signal and which one of the M synchronization signal pairs includes the second signal accidentally synchronizing with the first signal. The first calculator 48B, thus, randomly selects K synchronization signal pairs out of M synchronization signal pairs.

The first calculator 48B calculates the first energy Ec after correction and the count number to be allocated, for each of the selected K synchronization signal pairs.

The first calculator 48B calculates, for each of the synchronization signal pairs in combinations of the first detector 32A serving as the correction target and the respective second detectors 32B belonging to the third group, the first energy Ec after correction of the first signal included in each of the synchronization signal pairs and the count number to be allocated on the basis of synchronization signal pairs the number of which is the multiplication value obtained by multiplying the correction rate by the number of synchronization signal pairs in each combination.

The third calculator 48A may group the synchronization signal pairs of the first signals and the second signals into a fourth group, a fifth group, and a sixth group, and may calculate the correction rate for each of the groups (the fourth, the fifth, and the sixth groups). In this case, the first calculator 48B may calculate, for each of the groups (the fourth, the fifth, and the sixth groups), the number of synchronization signal pairs actually used for correction out of the number of synchronization signals belonging to the group using the correction rate corresponding to the group.

The fourth group includes the synchronization signal pairs in each of which at least one of the first energy Ea of the first signal and the second energy Eb of the second signal is equal to the characteristic X-ray energy Ex±ΔE. The fifth group includes the synchronization signal pairs of which neither the first energy Ea of the first signal nor the second energy Eb of the second signal is equal to the characteristic X-ray energy Ex±ΔE, and both of the first energy Ea of the first signal and the second energy Eb of the second signal are more than the first threshold Eth. The sixth group includes the synchronization signal pairs of which neither the first energy Ea of the first signal nor the second energy Eb of the second signal is equal to the characteristic x-ray energy Ex±ΔE, and at least one of the first energy Ea of the first signal and the second energy Eb of the second signal is equal to or less than the first threshold Eth.

The third calculator 48A calculates the correction rate for each of the fourth, the fifth, and the sixth groups. In this case, the third calculator 48A may calculate, as the correction rate for each of the groups, the proportion of a subtraction value to the total number of synchronization signal pairs belonging to the group (equal to the total number of second signals included in the synchronization signal pairs belonging to the group). The subtraction value is obtained by subtracting the number of second signals detected by the second detectors 32b belonging to the second group (the number of second signals at the saturation) from the total number of synchronization signal pairs belonging to the group.

After the correction rate is calculated for each of the groups (the fourth, the fifth, and the sixth groups), the first calculator 48B may calculate, for each of the groups, the multiplication value obtained by multiplying the number M' of synchronization signal pairs belonging to the group by the correction rate of the group as the number K' of synchronization signal pairs used for correction.

In this case, the first calculator 48B may calculate, for each of the groups (the fourth, the fifth, and the sixth groups), the first energy Ec after correction and the count number to be allocated, for each of the selected K' synchronization signal pairs belonging to the group.

The following describes the specific method performed by the first calculator 48B for calculating the first energy Ec after correction and the count number to be allocated.

The first calculator 48B determines whether each of the first energy Ea corresponding to the wave height of the first signal and the second energy Eb corresponding to the wave height of the second signal is equal to the characteristic X-ray energy Ex±ΔE of the scintillator raw material. The first calculator 48B calculates the first energy Ec after correction and the count number to be allocated in accordance with a case out of four cases roughly grouped on the basis of the determination.

Specifically, the first calculator 48B calculates "zero" as the first energy Ec after correction when the first energy Ea is equal to the characteristic X-ray energy Ex±ΔE of the scintillator raw material and the second energy Eb is not equal to the characteristic X-ray energy Ex±ΔE of the scintillator raw material. The first calculator 48B calculates "zero" as the count number to be allocated.

The first calculator 48B calculates a value of "Ea+Eb" as the first energy Ec after correction when the first energy Ea is not equal to the characteristic X-ray energy Ex±ΔE of the scintillator raw material and the second energy Eb is equal to the characteristic x-ray energy Ex±ΔE of the scintillator raw material. The first calculator 48B calculates "one" as the count number to be allocated.

The first calculator 48B calculates a value of "Ea+Eb" as the first energy Ec after correction when the first energy Ea is equal to the characteristic X-ray energy Ex±ΔE of the scintillator raw material and the second energy Eb is equal to the characteristic X-ray energy Ex±ΔE of the scintillator raw material. The first calculator 48B calculates a predetermined value smaller than one as the count number to be allocated.

The "value smaller than one" may be based on a predetermined probability when it is expected that radiation enters the first detector 32A. The "value smaller than one" is 0.5, for example. The following description is made on the basis that the value smaller than one is 0.5. The value is, however, not limited to 0.5.

When at least one of the first energy Ea and the second energy Eb is equal to the characteristic X-ray energy Ex±ΔE of the scintillator raw material, the first calculator 48B deems that scintillation light propagating from a region in which it should be detected by another detector 32 to the scintillator layer 35 and the adhesive layer 34 is detected by the detector 32 that should originally detect the scintillation light, and calculates the first energy Ec after correction. In this case, the first calculator 48B adds the energy of the synchronization signal detected by another detector 32 (e.g., the second energy Eb) to the energy corresponding to the wave height of the signal detected by the detector 32 that should originally detect the scintillation light (e.g., the first energy Ea).

When the first energy Ea is not equal to the characteristic X-ray energy Ex±ΔE of the scintillator raw material and the second energy Eb is not equal to the characteristic X-ray energy Ex±ΔE of the scintillator raw material, the first calculator 48B deems that scintillation light that should be detected by a certain detector 32 propagates to another detector 32. In this case, the first calculator 48B adds energy of scintillation light propagating to another detector 32 to the energy detected by the detector 32 that should originally detect the scintillation light. The first calculator 48B calculates the addition value as the first energy Ec after correction.

The first calculator 48B preferably calculates the first energy Ec after correction in an energy area in which the frequency of the occurrence of synchronization signals is high.

The first calculator 48B, thus, preferably calculates the first energy Ec after correction further using the first threshold Eth calculated by the threshold calculator 45 when the first energy Ea is not equal to the characteristic X-ray energy Ex±ΔE of the scintillator raw material and the second energy Eb is not equal to the characteristic x-ray energy Ex±ΔE of the scintillator raw material. The first calculator 48B may read the first threshold Eth corresponding to the identification information about the second detector 32B that detects the second signal included in each of the synchronization signal pairs from the storage 42, and may use it for calculation.

When the first energy Ea is not equal to the characteristic X-ray energy Ex±ΔE of the scintillator raw material and the second energy Eb is not equal to the characteristic X-ray energy Ex±ΔE of the scintillator raw material, the first calculator 48B calculates the first energy Ec after correction in accordance with the following cases.

When the first energy Ea is less than the second energy Eb and the first energy Ea is less than the first threshold Eth, the first calculator 48B calculates "zero" as the first energy Ec after correction (no count number is allocated).

When the first energy Ea is equal to or more than the second energy Eb and the second energy Eb is less than the first threshold Eth, the first calculator 48B calculates a value of "Ea+Eb" as the first energy Ec after correction. In a case other than those cases, the first calculator 48B calculates the first energy Ea as the first energy Ec after correction.

Specifically, when both of the first energy Ea and the second energy Eb are not equal to the characteristic X-ray energy Ex±ΔE, the first energy Ea is less than the second energy Eb, and the first energy Ea is less than the first threshold Eth, the first calculator 48B deems that the first and the second signals are signals originally entering the second detector 32B. In this case, the first calculator 48B calculates "zero" as the first energy Ec after correction and "zero" as the count number to be allocated.

When both of the first energy Ea and the second energy Eb are not equal to the characteristic X-ray energy Ex±ΔE, the first energy Ea is less than the second energy Eb, and the first energy Ea is equal to or more than the first threshold Eth, the first calculator 48B deems that the first and the second signals accidentally synchronize with each other. In this case, the first calculator 48B calculates the first energy Ea as the first energy Ec after correction and "one" as the count number to be allocated.

When both of the first energy Ea and the second energy Eb are not equal to the characteristic X-ray energy Ex±ΔE, the first energy Ea is equal to or more than the second energy Eb, and the second energy Eb is less than the first threshold Eth, the first calculator 48B deems that the first and the second signals are signals originally entering the first detector 48A. In this case, the first calculator 48B calculates the addition value of the first energy Ea and the second energy Eb as the first energy Ec after correction. The first calculator 48B calculates "one" as the count number to be allocated.

When both of the first energy Ea and the second energy Eb are not equal to the characteristic X-ray energy Ex±ΔE, the first energy Ea is equal to or more than the second energy Eb, and the second energy Eb is equal to or more than the first threshold Eth, the first calculator 48B deems that the first and the second signals accidentally synchronize with each other. In this case, the first calculator 48B calculates the first energy Ea as the first energy Ec after correction and "one" as the count number to be allocated.

When the first energy Ea is equal to the characteristic X-ray energy Ex±ΔE and the second energy Eb is not equal to the characteristic X-ray energy Ex±ΔE, the first calculator 48B deems that the first and the second signals are signals originally entering the second detector 32B. In this case, the first calculator 48B calculates "zero" as the first energy Ec after correction and "zero" as the count number to be allocated.

When the first energy Ea is not equal to the characteristic X-ray energy Ex±ΔE and the second energy Eb is equal to the characteristic X-ray energy Ex±ΔE, the first calculator 48B deems that the first and the second signals are signals originally entering the first detector 32A. In this case, the first calculator 48B calculates the addition value of the first energy Ea and the second energy Eb as the first energy Ec after correction and "one" as the count number to be allocated.

When both of the first energy Ea and the second energy Eb are equal to the characteristic X-ray energy Ex±ΔE, the first calculator 48B deems that radiation enters any one of the first detector 32A and the second detector 32B, and characteristic X-rays generated in the one detector 32 that the radiation enters, out of the first detector 32A and the second detector 32B, enters the other detector 32. In this case, the first calculator 48C calculates the addition value of the first energy Ea and the second energy Eb as the first energy Ec after correction. The first calculation section 48B calculates a predetermined value smaller than one (in the embodiment, the value is 0.5) as the count number to be allocated.

The first calculator 48B calculates, for each of the synchronization signal pairs of the first signals and the second signals in the respective combinations of the first detector 32A serving as the correction target and the respective second detectors 32B belonging to the third group identified by the third identifier 47D, the first energy Ec after correction corresponding to the first signal in each of the synchronization signal pairs.

The first corrector 48C corrects the energy spectrum detected by the first detector 32A serving as the correction target using the first energy Ec after correction corresponding to the first signals included in the respective synchronization signal pairs and the count numbers allocated to the first energy Ec after correction.

Specifically, the first corrector 48C produces, as an energy spectrum after correction, the energy spectrum represented by the number of synchronization signal pairs, the first energy Ec after correction corresponding to the first signals included in the respective synchronization signal pairs, the count numbers allocated to the first energy Ec after correction, the number of signals other than the first signals out of the signals detected by the first detector 32A, and the energy corresponding to the wave heights of the signals other than the first signals.

The signals other than the first signals out of the signals detected by the first detector 32A include the signals that do not synchronize with the second signals.

In this way, the first corrector 48C corrects the energy spectrum detected by the first detector 32A serving as the correction target.

The following specifically describes the processing performed by the first corrector 48C.

The first corrector 48C reads the first energy Ec after correction and the corresponding count numbers to be allocated each of which Ec and count numbers are calculated for each of the synchronization signal pairs of the first signals and the second signals in the respective combinations of the first detector 32A serving as the correction target and the respective second detectors 32B belonging to the third group identified by the third identifier 47D.

The first corrector 48C counts the number of signals corresponding to respective values of the read first energy Ec after correction by the count value indicated by the corresponding count number to be allocated, and obtains a first energy spectrum.

For example, it is assumed that 0.5 counts are provided as the count number to be allocated to the first energy Ec after correction read by the first corrector 48C. In this case, the first corrector 48C counts the number of signals on the basis that one signal is counted 0.5 counts for the first energy Ec after correction. It is assumed that one count is provided as the count number to be allocated to the first energy Ec after correction read by the first corrector 48C. In this case, the first corrector 48C counts the number of signals on the basis that one signal is counted one count for the first energy Ec after correction. In this way, the first corrector 48C counts the number of signals corresponding to the respective values of the first energy Ec after correction, and obtains the first energy spectrum.

The first corrector 48C reads the signals other than the first signals out of the signals detected by the first detector 32A serving as the correction target. The first corrector 48C counts the number of signals corresponding to the respective values of energy corresponding to the respective wave heights of the signals other than the first signals, and obtains a second energy spectrum. The first corrector 48C counts the signals other than the first signals (signals do not synchronize with the second signals) out of the signals detected by the first detector 32A in such manner that one signal is counted one count.

The first corrector 48C produces the spectrum obtained by combining the first energy spectrum and the second energy spectrum as the energy spectrum after correction, which means that the energy spectrum detected by the first detector 32A serving as the correction target is corrected.

The energy spectrum produced by the first corrector 48C is the energy spectrum (energy spectrum after correction) obtained by subtracting an influence of cross talk from the energy spectrum (energy spectrum before correction) by the signals detected by the first detector 32A serving as the correction target.

When a histogram is produced by counting the number of signals for each energy value, it is preferable to allocate one count of the number of signals to an energy bin having a Gaussian shape.

The first corrector 48C, thus, uses a Gaussian distribution having the value of the first energy Ec after correction as the center value and a limited width determined by the energy resolution. The first corrector 48C performs weighting in accordance with the Gaussian distribution such that the weighting value becomes larger as the energy value reaches the center value Ec from the energy values of Ec plus or minus energy resolution, and the sum of the weighting values is one. The first corrector 48C preferably allocates one count to count numbers below decimal point used for weighting integer energy values in a range of first energy Ec after correction plus or minus energy resolution. The energy resolution may be set to different values depending on the first energy Ec after correction.

When the first energy Ea is equal to the characteristic X-ray energy Ex±ΔE of the scintillator raw material and the second energy Eb is equal to the characteristic X-ray energy Ex±ΔE of the scintillator raw material, weighting is performed in accordance with a Gaussian distribution such that the sum of weighting values is 0.5. The first corrector 48C allocates 0.5 counts to count numbers below decimal point used for weighting integer energy values in a range of first energy Ec after correction plus or minus energy resolution.

In the above description, a case is described in which the corrector 48 performs correction on the basis of an assumption that one row of the detectors 32 (e.g., one row along the arrow X direction in FIG. 3) is taken from the detectors 32 provided in the detector array 33, and scintillation light and characteristic X-rays propagate from or to other detectors 32 arranged in the arrow X direction.

The corrector 48 preferably performs correction on each of the detectors 32 arranged in a matrix along the arrow X and the arrow Y directions assuming that scintillation light and characteristic X-rays propagate not only from and to a specific one direction (e.g., the arrow X direction) but also from and to adjacent detectors 32 in all directions.

The corrector 48 preferably performs correction on each of the detectors 32 provided in the detector array 33 taking into consideration scintillation light and characteristic X-rays that propagate from or to the other detectors 32 in all directions along the first surface 33A. The propagation of scintillation light and characteristic X-rays from or to the other detectors 32 in all directions along the first surface 33A is described as a "light's leakage from all directions".

In this case, the first corrector 48C may perform correction on the first detector 32A set as the correction target taking into consideration the light's leakage from all directions along the first surface 33A.

Figure 12:
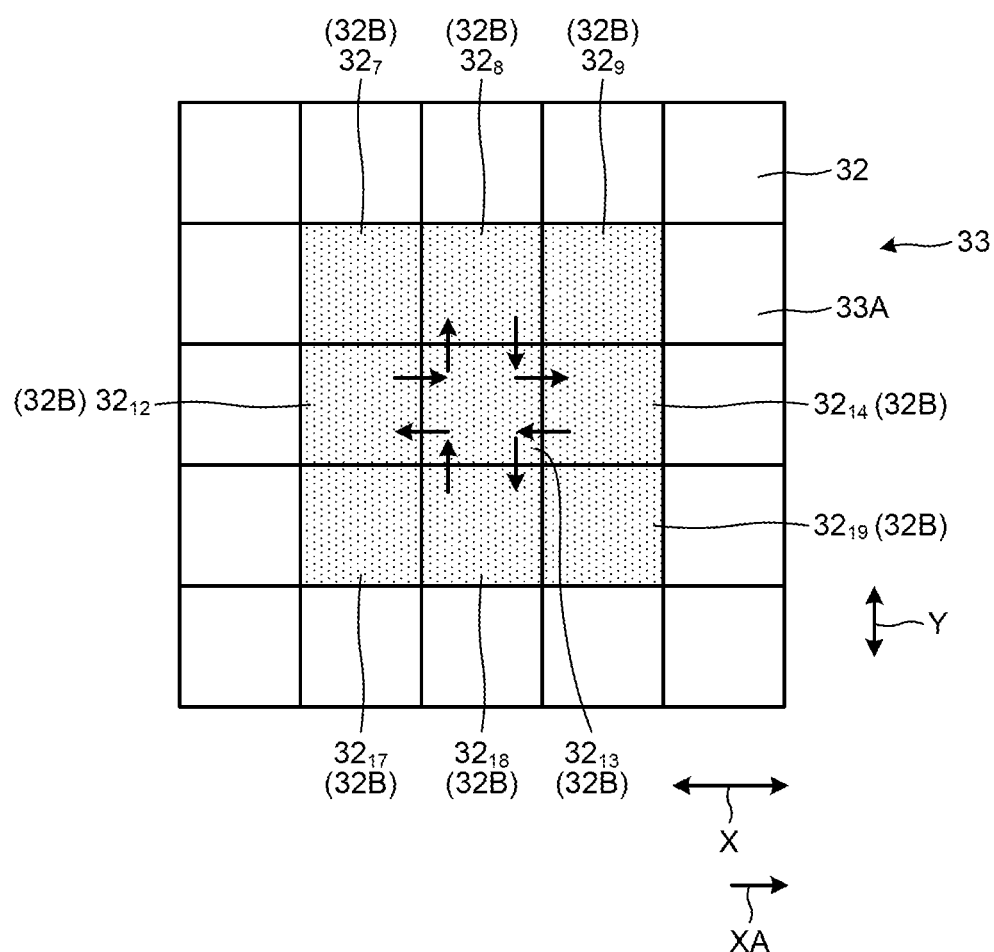
FIG. 12 is an explanatory view of correction taking into consideration a light's leakage from all directions.

FIG. 12 is an explanatory view of correction taking into consideration the light's leakage from all directions, for example.

It is assumed that the detector $32_{13}$ located at the center of the detector array 33 is set as the first detector 32A serving as the correction target, as illustrated in FIG. 12. The first surface 33A, which faces the scintillator layer 35 (not illustrated in FIG. 12), of each of the detector 32 has a square shape.

It is assumed that scintillation light and characteristic X-rays propagate up to the detectors surrounding and adjacent to the detector $32_{13}$. In this case, the first corrector 48C performs correction on four detectors (detectors $32_8$, $32_{12}$, $32_{14}$, and $32_{18}$) each in contact with corresponding one of the four sides of the detector $32_{13}$, and four detectors (detectors $32_7$, $32_9$, $32_{17}$, and $32_{19}$) each in contact with only any one of four vertexes of the detector $32_{13}$, and calculates the energy spectrum after correction in relation to the detector $32_{13}$.

The processing described above makes it possible for the corrector 48 to obtain the energy spectrum after correction without a light's leakage of scintillation light and characteristic X-rays that propagate from and to the adjacent detectors 32 in all directions (in this case, eight directions illustrated in FIG. 12).

The following describes a procedure of control processing performed by the controller 22.

Figure 13:
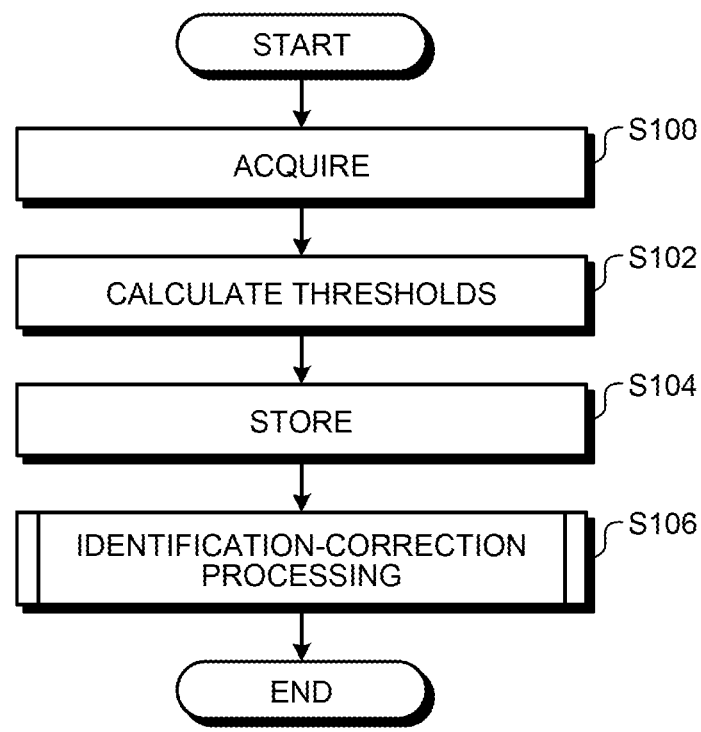
FIG. 13 is a flowchart illustrating a procedure of radiation detection processing.

FIG. 13 is a flowchart illustrating a procedure of radiation detection processing performed by the controller 22. FIG. 13 illustrates a case where the third calculator 48A calculates correction rates used for calculating the number of synchronization signal pairs actually used for correction out of the synchronization signal pairs of the first signals of the first detector 32A and the second signals of the second detector 32B regardless of the fourth, the fifth, and the sixth groups described above.

The acquirer 44 acquires signals detected by the respective detectors 32 in the detector array 33 (step S100).

The threshold calculator 45 calculates, for each of the detectors 32, the second threshold Vth and the first threshold Eth using the signals detected at step S100 (step S102). The threshold calculator 45 stores the first thresholds Eth and the second thresholds Vth, each of which are calculated for each detector 32, in the storage 42 in association with the identification information about each detector 32 (step S104).

The controller 22 performs identification-correction processing (step S106). Then, this routine ends.

Figure 14:
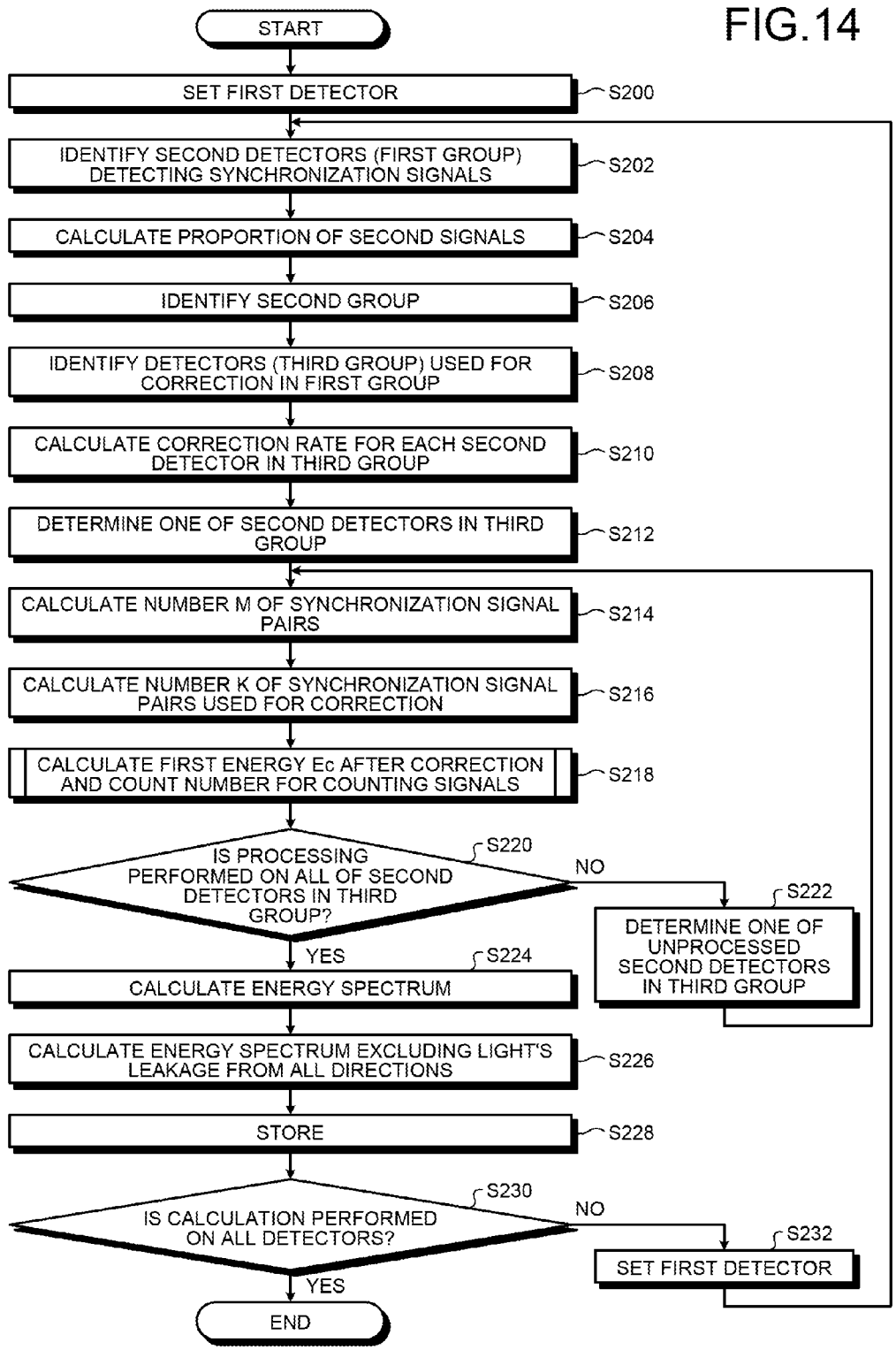
FIG. 14 is a flowchart illustrating a procedure of identification-correction processing.

FIG. 14 is a flowchart illustrating a procedure of the identification-correction processing at step S106 in FIG. 13.

The setting unit 46 sets one of the detectors 32 that are not yet subjected to the processing from step S202 to step S228 to the first detector 32A serving as the correction target (step S200).

The first identifier 47A of the identifier 47 identifies, out of the detectors 32 provided in the detector array 33, the first group of the second detectors 32B that detect the synchronization signals synchronizing with the first signals detected by the identified first detector 32A serving as the detection target (step S202).

The second calculator 47B calculates, for each of the second detectors 32B belonging to the first group, a proportion of the second signals synchronizing with the first signals to all of the detected signals (step S204).

The second identifier 47C identifies, out of the second detectors 32B belonging to the first group, the second detectors 32B belonging to the second group (step S206). As described above, the second detectors 32B belonging to the second group are the second detectors 32B in each of which the reduction in proportion of the second signals is saturated out of the second detector 32B belonging to the first group. The proportions of the second signals detected by the respective second detectors 32B arranged in a direction apart from the location adjacent to the first detector 32A are reduced and saturated.

The third identifier 47D identifies the detectors 32 used for the correction of the first signals of the first detector 32A (step S208). At step S208, the third identifier 47D identifies, out of the second detectors 32B belonging to the first group, the second detectors 32B that do not belong to the second group as the detectors 32 used for the correction of the first signals. The third identifier 47D identifies the second detectors 32B belonging to the third group.

The third calculator 48A calculates, for each of the second detectors 32B belonging to the third group, the correction rate (step S210). The third calculator 48A stores the calculated correction rate in the storage 42 in association with the identification information about the corresponding second detector 32B.

The first calculator 48B determines, out of the second detectors 32B belonging to the third group, one of the second detectors 32B that are not yet subjected to the processing from step S214 to step S220 (step S212).

The first calculator 48B calculates the number (M, which is an integer equal to or larger than one) of synchronization signal pairs of the first signals in the first detector 32A set by the setting unit 46 as the correction target and the second signals synchronizing with the first signals in the second detector 32B decided at step S212 (step S214).

The first calculator 48B calculates the number (K, which is an integer equal to or larger than one) of synchronization signal pairs used for the correction out of the calculated number M of synchronization signal pairs (step S216). The first calculator 48B calculates the multiplication value obtained by multiplying the number M of synchronization signal pairs calculated at step S214 by the correction rate (calculated at step S210) corresponding to the second detector 32B decided at step S212 as the number (K) of synchronization signal pairs used for the correction.

The first corrector 48C calculates, for each of the number K of synchronization signal pairs calculated at step S216, the first energy Ec after correction, which is obtained by correcting the first energy Ea corresponding to the wave height of the first signal included in the synchronization signal pair, and the count number allocated to the first energy (step S218). The processing at step S218 is described later in detail.

The first corrector 48C determines, for each of all of the second detectors 32B belonging to the third group, whether the second detector 32B is already subjected to the processing from step S214 to step S218 (step S220). If the second detector 32B that is not yet processed is included (No at step S220), the processing proceeds to step S222. At step S222, the first corrector 48C determines, out of the second detectors 32B belonging to the third group, one of the second detectors 32B that are not yet subjected to the processing from step S214 to step S220 (step S222). Then, the processing returns to step S214.

If all of the second detectors 32B belonging to the third group are already processed from step S214 to step S218 (Yes at step S220), the processing proceeds to step S224.

At step S224, the first corrector 48C calculates the energy spectrum after correction of the first detector 32A serving as the correction target using the first energy Ec after correction corresponding to the first signals and the count numbers allocated to the first energy that are calculated by the processing at step S218 (step S224).

The first corrector 48C calculates the energy spectrum after correction taking into consideration the light's leakage from all directions (step S226).

The first corrector 48C stores the energy spectrum after correction calculated at step S226 in the storage 42 as the energy spectrum after correction corresponding to the first detector 32A set as the correction target (step S228).

The setting unit 46 determines, on all of the detectors 32 provided in the detector array 33, whether the energy spectrum after correction is already calculated (step S230). If a negative determination is made at step S230 (No at step S230), the processing proceeds to step S232.

At step S232, the setting unit 46 sets one of the detectors 32 provided in the detector array 33 that are not yet subjected to the processing from step S202 to step S228 as the first detector 32A serving as the new correction target (step S232). Then, the processing returns to step S202.

If a positive determination is made at step S230 (Yes at step S230), this routine ends.

Figure 15:
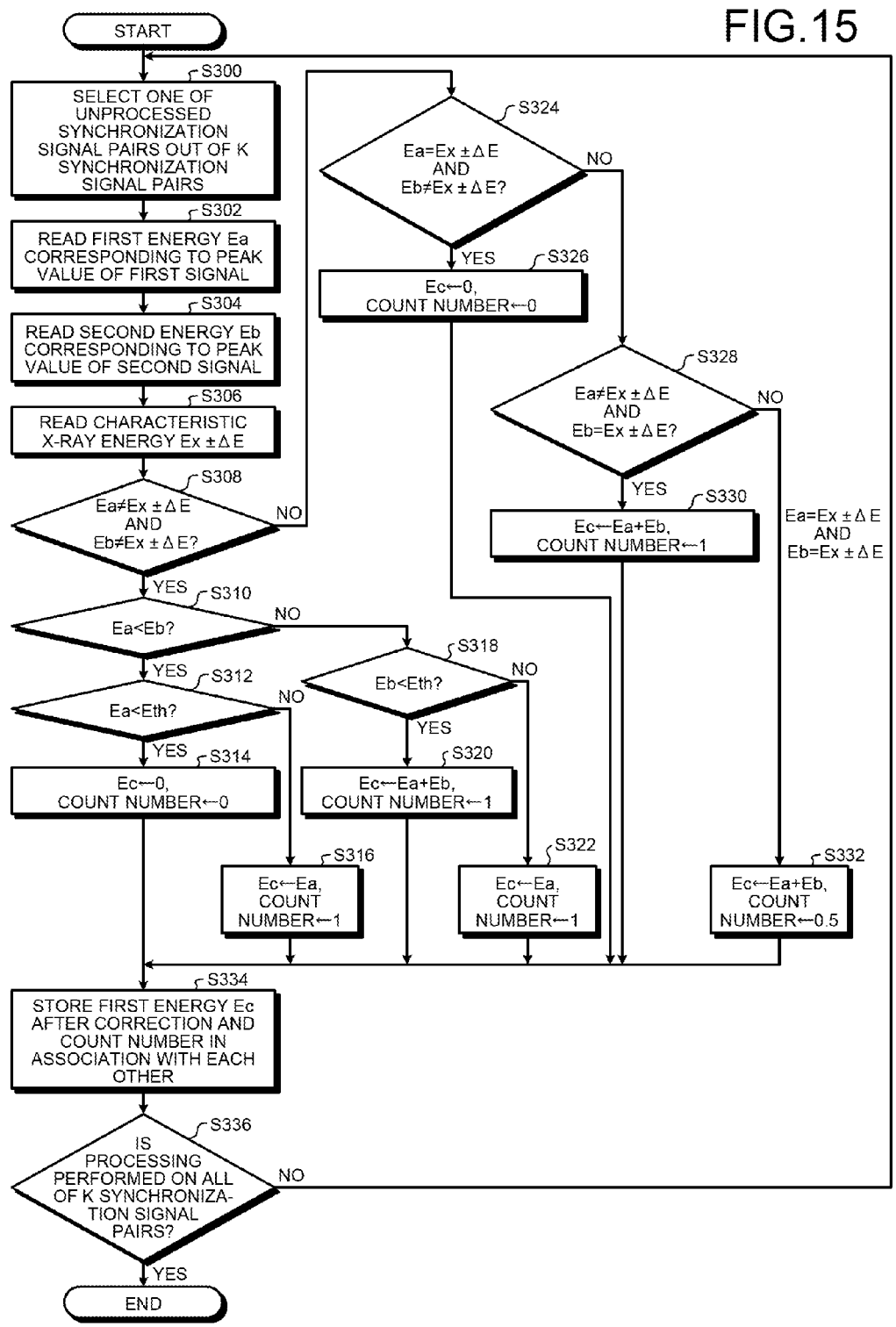
FIG. 15 is a flowchart illustrating a procedure of calculating first energy after correction.

The following describes the processing at S218 in FIG. 14 in detail. FIG. 15 is a flowchart illustrating a procedure of processing to calculate the first energy Ec after correction at step S218.

The first calculator 48B selects one of the unprocessed synchronization signals out of the number K of synchronization signal pairs (step S300). K is the number of synchronization signal pairs calculated at step S216 (refer to FIG. 14).

The first calculator 48B reads the first energy Ea corresponding to the wave height of the first signal included in the selected synchronization signal (step S302). The first calculator 48B reads the second energy Eb corresponding to the wave height of the second signal included in the selected synchronization signal (step S304).

The first calculator 48B reads the characteristic X-ray energy Ex±ΔE of the scintillator raw material from the storage 42 (step S306).

From step S308 to step S334, the respective values read from step S300 to step S306 are used as corresponding values of the first energy Ea, the second energy Eb, and the characteristic x-ray energy Ex±ΔE of the scintillator raw material.

The first calculator 48B determines whether both of the first energy Ea and the second energy Eb are not equal to the characteristic X-ray energy Ex±ΔE of the scintillator raw material (step S308).

If a positive determination is made at step S308 (Yes at step S308), the processing proceeds to step S310. At step S310, the first calculator 48B determines whether the first energy Ea is less than the second energy Eb (step S310).

If a positive determination is made at step S310 (Yes at step S310), the processing proceeds to step S312. At step S312, the first calculator 48B determines whether the first energy Ea is less than the first threshold Eth (step S312). The first threshold Eth used at step S312 is calculated at step S102 (refer to FIG. 13). The first calculator 48B may read the first threshold Eth corresponding to the identification information about the second detector 32B determined at step S212 (refer to FIG. 14) from the storage 42, and may use it at step S312.

If a positive determination is made at step S312 (Yes at step S312), the processing proceeds to step S314. At step S314, the first calculator 48B sets the first energy Ec after correction to zero and the count number to be allocated to zero (step S314). Then, the processing proceeds to step S334, which is described later.

If a negative determination is made at step S312 (No at step S312), the processing proceeds to step S316. At step S316, the first calculator 48B calculates the first energy Ea before correction as the first energy Ec after correction and sets the count number to be allocated to "one" (step S316). Then, the processing proceeds to step S334, which is described later.

If a negative determination is made at step S310 (No at step S310), the processing proceeds to step S318. At step S318, the first calculator 48B determines whether the second energy Eb is less than the first threshold Eth (step S318). The first calculator 48B may acquire the first threshold Eth used at step S318 in the same manner as step S312.

If a positive determination is made at step S318 (Yes at step S318), the processing proceeds to step S320. At step S320, the first calculator 48B calculates the value of "the first energy Ea+the second energy Eb" as the first energy Ec after correction and sets the count number to be allocated (step S320) to "one". Then, the processing proceeds to step S334, which is described later.

If a negative determination is made at step S318 (No at step S318), the processing proceeds to step S322. At step S322, the first calculator 48B calculates the first energy Ea before correction as the first energy Ec after correction and sets the count number to be allocated to "one" (step S322). Then, the processing proceeds to step S334, which is described later.

If a negative determination is made at step S308 (No at step S308), the processing proceeds to step S324. At step S324, the first calculator 48B determines whether the first energy Ea is equal to the characteristic X-ray energy Ex±ΔE of the scintillator raw material and the second energy Eb is not equal to the characteristic X-ray energy Ex±ΔE of the scintillator raw material (step S324).

If a positive determination is made at step S324 (Yes at step S324), the processing proceeds to step S326. At step S326, the first calculator 48B sets the first energy Ec after correction to "zero" and sets the count number to be allocated to "zero" (step S326). Then, the processing proceeds to step S334, which is described later.

If a negative determination is made at step S324 (No at step S324), the processing proceeds to step S328. At step S328, the first calculator 48B determines whether the first energy Ea is not equal to the characteristic X-ray energy Ex±ΔE of the scintillator raw material and the second energy Eb is equal to the characteristic X-ray energy Ex±ΔE of the scintillator raw material (step S328).

If a positive determination is made at step S328 (Yes at step S328), the processing proceeds to step S330. At step S330, the first calculator 48B calculates the value of "the first energy Ea+the second energy Eb" as the first energy Ec after correction and sets the count number to be allocated to "one" (step S330). Then, the processing proceeds to step S334, which is described later.

If a negative determination is made at step S328 (No at step S328), the processing proceeds to step S332. The negative determination at step S328 is made particularly in a case where the first energy Ea is equal to the characteristic X-ray energy Ex±ΔE of the scintillator raw material and the second energy Eb is equal to the characteristic X-ray energy Ex±ΔE of the scintillator raw material.

At step S332, the first calculator 48B calculates the value of "the first energy Ea+the second energy Eb" as the first energy Ec after correction and the count number to be allocated to "0.5" (step S332). Then, the processing proceeds to step S334, which is described later.

At step S334, the first calculator 48B stores the first energy Ec after correction calculated by the processing from step S308 to step S332 in the storage 42 as the first energy Ec after correction of the first signal included in the synchronization signal pair selected at step S300. The first calculator 48B stores, in the storage 42, the first energy Ec after correction calculated by the processing from step S308 to step S332 and the calculated count number to be allocated in association with each other.

The first corrector 48C determines whether the processing from step S300 to step S334 is already performed on all of the K synchronization signal pairs (step S336). If a negative determination is made at step S336 (No at step S336), the processing returns to step S300. If a positive determination is made at step S336 (Yes at step S336), this routine ends.

When the third calculator 48A calculates the correction rate for each of the groups (the fourth, the fifth, and the sixth groups), the first calculator 48B may calculate, as the number K' of synchronization signal pairs used for correction for each of the groups (the fourth, the fifth, and the sixth groups), the multiplication value obtained by multiplying the number M' of synchronization signal pairs belonging to the group by the correction rate of the group. In this case, the first calculator 48B may calculate the first energy Ec after correction and the count number to be allocated for each of the selected K' synchronization signal pairs belonging to the group, for each of the groups (the fourth, the fifth, and the sixth groups). The first corrector 48C may calculate the energy spectrum after correction of the first detector 32A serving as the correction target in the same manner as step S224.

As described above, the radiation detection device 10 in the embodiment includes the scintillator layer 35, the multiple detectors 32, the setting unit 46, the identifier 47, and the corrector 48. The scintillator layer 35 converts the radiation L into scintillation light. The detectors 32, which are arranged along the first surface 33A facing the scintillator layer 35, detect light. The setting unit 46 sets the first detector 32A serving as the correction target out of the detectors 32. The identifier 47 identifies the second detectors 32B that detect the synchronization signals synchronizing with the first signals detected by the first detector 32A out of the detectors 32. The corrector 48 corrects the energy spectrum of light detected by the first detector 32A on the basis of the second signals serving as the synchronization signals synchronizing with the first signals out of the signals detected by the second detectors 32B, the first signals, and the characteristic X-ray energy of the scintillator raw material of the scintillator layer 35.

The radiation detection device 10 in the embodiment corrects the energy spectrum of light detected by the first detector 32A on the basis of the second signals serving as the synchronization signals detected by the second detectors 32B that detect the synchronization signals synchronizing with the first signals detected by the first detector 32A out of the detectors 32, and the characteristic X-ray energy of the scintillator raw material. The radiation detection device 10 in the embodiment obtains a leakage due to optical cross talk occurring among the detectors 32 using the first signals, the second signals serving as the synchronization signals synchronizing with the first signals, and the characteristic X-ray energy, and corrects the energy spectrum of light.

As a result, the radiation detection device 10 in the embodiment can increase the detection accuracy.

Figure 16:
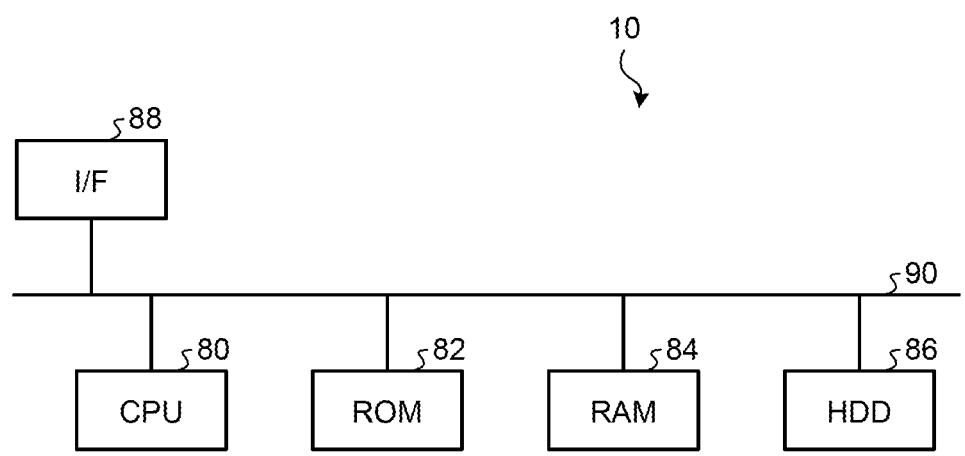
FIG. 16 is a block diagram illustrating an exemplary hardware structure of the radiation detection device.

The following describes a hardware structure of the radiation detection device 10 in the embodiment. FIG. 16 is a block diagram illustrating the hardware structure of the radiation detection device 10 in the embodiment.

The radiation detection device 10 in the embodiment has the hardware structure using a typical computer. The hardware structure includes an interface (I/F) 88, a central processing unit (CPU) 80, a read only memory (ROM) 82, a random access memory (RAM) 84, a hard disk drive (HDD) 86, and a bus 90 that connects the respective units to one another.

The CPU 80 is a computing unit that controls the processing of the whole of the radiation detection device 10. The RAM 84 stores therein data necessary for various types of processing performed by the CPU 80. The ROM 82 stores therein a program that achieves the various types of processing performed by the CPU 80. The HDD 86 stores therein data stored in the storage 42. The I/F 88 is coupled to an external device and an external terminal via a communication line and serves as an interface to transmit data to and receive data from the coupled external device and external terminal.

The program to achieve the various types of processing performed by the radiation detection device 10 in the embodiment is embedded and provided in the ROM 82, for example.

The program executed by the radiation detection device 10 in the embodiment may be recorded and provided on a computer-readable recording medium, which may be provided as a computer program product such as a compact disc read only memory (CD-ROM), a flexible disk (FD), a compact disc recordable (CD-R), and a digital versatile disc (DVD), as an installable or executable file.

The program executed by the radiation detection device 10 in the embodiment may be stored in a computer connected to a network such as the Internet, and be provided by being downloaded through the network. The program executed by the radiation detection device 10 in the embodiment may be provided or delivered through a network such as the Internet.

The program to achieve the various types of processing performed by the radiation detection device 10 in the embodiment is configured to produce the respective units in a main storage device.

The various types information stored in the HDD 86, i.e., various types of information stored in the storage 42, may be stored in an external apparatus (e.g., a server). In this case, the external apparatus and the CPU 80 may be coupled via the I/F 88.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A radiation detection device, comprising:
   a scintillator layer configured to convert X-rays into scintillation light;
   a plurality of detectors arranged along a first surface facing the scintillator layer to detect the scintillation light;
   a setting unit configured to randomly set one detector from among the detectors as a first detector to be corrected;
   an identifier configured to identify, out of the detectors, one or more second detectors, each detecting a synchronization signal synchronizing with a first signal detected by the first detector; and
   a corrector configured to correct an energy spectrum of the scintillation light detected by the first detector on the basis of one or more second signals, each serving as the synchronization signal synchronizing with each of one or more first signals in signals detected by each of the second detectors, the first signals, and characteristic X-ray energy of a scintillator raw material constituting the scintillator layer, wherein
   the corrector includes:
      a first calculator configured to calculate, for each synchronization signal pair of the first signal and a second signal synchronizing with the first signal in a plurality of synchronization signal pairs, on the basis of a magnitude relation among a first energy corresponding to a wave height of the first signal, a second energy corresponding to a wave height of the second signal, and the characteristic X-ray energy, the first energy that is corrected to be treated as a value after correction and the number of signals allocated to the corrected first energy when an energy spectrum is calculated, and
      a first corrector configured to correct the energy spectrum detected by the first detector using the corrected first energy corresponding to the first signal included in each of the synchronization signal pairs and the number of the signals, and
   the identifier includes:
      a first identifier configured to identify, out of the detectors, a first group of the second detectors that detect synchronization signals synchronizing with the first signals detected by the first detector;

a second calculator configured to calculate proportions of the second signals detected by the respective second detectors belonging to the first group;

a second identifier configured to identify a second group of the second detectors in each of which a reduction in proportion of the second signals is saturated, the proportions of the second signals being detected by the respective second detectors arranged in a direction apart from a location adjacent to the first detector being reduced; and a third identifier configured to identify the second detectors not belonging to the second group out of the second detectors belonging to the first group as the detectors used for correction of the first signals.

2. The radiation detection device according to claim 1, wherein the second signal is detected within a certain time from the detection of the first signal.

3. The radiation detection device according to claim 1, wherein the first calculator identifies the first signal and the second signal as signals originally entering the second detector and sets the number of signals to be allocated to zero when the first energy and the second energy are not equal to the characteristic X-ray energy, when the first energy is less than the second energy, and when the first energy is less than a first threshold.

4. The radiation detection device according to claim 1, wherein the first calculator identifies the first signal and the second signal as signals accidentally synchronized with each other, sets the first energy as the corrected first energy, and sets the number of signals to be allocated to one when the first energy and the second energy are not equal to the characteristic X-ray energy, when the first energy is less than the second energy, and when the first energy is equal to or more than a first threshold.

5. The radiation detection device according to claim 1, wherein the first calculator identifies the first signal and the second signal as signals originally entering the first detector, sets an addition value of the first energy and the second energy as the corrected first energy, and sets the number of signals to be allocated to one when the first energy and the second energy are not equal to the characteristic X-ray energy, when the first energy is equal to or more than the second energy, and when the second energy is less than a first threshold.

6. The radiation detection device according to claim 1, wherein the first calculator identifies the first signal and the second signal as signals accidentally synchronized with each other, and sets the first energy to the corrected first energy, and sets the number of signals to be allocated to one when the first energy and the second energy are not equal to the characteristic X-ray energy, when the first energy is equal to or more than the second energy, and when the second energy is equal to or more than a first threshold.

7. The radiation detection device according to claim 1, wherein the first calculator identifies the first signal and the second signal as signals originally entering the second detector and sets the number of signals to be allocated to zero when the first energy is equal to the characteristic X-ray energy and the second energy is not equal to the characteristic X-ray energy.

8. The radiation detection device according to claim 1, wherein the first calculator identifies the first signal and the second signal as signals originally entering the first detector, sets an addition value of the first energy and the second energy to the corrected first energy, and sets the number of signals to be allocated to one when the first energy is not equal to the characteristic X-ray energy and the second energy is equal to the characteristic X-ray energy.

9. The radiation detection device according to claim 1, wherein the first calculator identifies that X rays enter either the first detector or the second detector and a characteristic X-ray generated in one detector, which the X-rays have entered, enters the other detector, and sets an addition value of the first energy and the second energy to the corrected first energy, and calculates a predetermined value less than one as the number of the signals to be allocated when the first energy and the second energy are equal to the characteristic X-ray energy.

10. The radiation detection device according to claim 1, wherein the first corrector corrects the energy spectrum detected by the first detector by producing, as a corrected energy spectrum, an energy spectrum that is represented by the number of synchronization signal pairs, the corrected first energy corresponding to the first signal included in each of the synchronization signal pairs, the number of signals allocated to the corrected first energy, the number of signals excluding the first signal in the signals detected by the first detector, and energy corresponding to the wave heights of the signals excluding the first signal.

11. The radiation detection device according to claim 1, wherein the corrector corrects the energy spectrum of the scintillation light detected by the first detector on the basis of the second signal out of signals detected by the second detector identified as a detector used for correction of the first signal, the first signal, and the characteristic X-ray energy of the scintillator raw material constituting the scintillator layer.

12. The radiation detection device according to claim 1, wherein
the corrector includes a third calculator configured to calculate a correction rate, and
the first calculator calculates the first energy after correction on the basis of a magnitude relation among the first energy corresponding to the wave height of the first signal, the second energy corresponding to the wave height of the second signal synchronizing with the first signal, and the characteristic X-ray energy, for each of the synchronization signal pairs, the number of synchronization signal pairs being obtained by multiplying the number of synchronization signal pairs by the calculated corresponding correction rate.

13. The radiation detection device according to claim 12, wherein the third calculator calculates, as the correction rate, for each of the second detectors identified as the detector used for correction, a proportion of a subtraction value to the total number of second signals detected by the second detector identified as the detector used for correction, the subtraction value being obtained by subtracting the number of second signals detected by the second detectors belonging to the second group from the total number.

14. The radiation detection device according to claim 12, wherein the third calculator calculates, as the correction rate, for each of the second-detectors identified as the detector used for correction, a proportion of a subtraction value to the total number of second signals that indicate the second energy equal to the characteristic X-ray energy and are detected by the second detector identified as the detector used for correction, the subtraction value being obtained by subtracting the number of second signals that indicate the second energy equal to the characteristic X-ray energy and are detected by the second detectors belonging to the second group from the total number.

15. The radiation detection device according to claim 12, wherein
the third calculator determines, for each synchronization signal pair of the first signal and the second signal in the plurality of synchronization signal pairs, which group the synchronization signal pair belongs to among a fourth group in which at least one of the first energy of the first signal and the second energy of the second signal is equal to the characteristic X-ray energy, a fifth group in which neither the first energy of the first signal nor the second energy of the second signal is equal to the characteristic X-ray energy, and both of the first energy of the first signal and the second energy of the second signal are more than the first threshold, and a sixth group in which neither the first energy of the first signal nor the second energy of the second signal is equal to the characteristic X-ray energy, and at least one of the first energy of the first signal and the second energy of the second signal is equal to or less than the first threshold, and calculates the correction rate for each of the fourth, the fifth, and the sixth groups, and
the first calculator calculates, for each of the fourth, the fifth, and the sixth groups, a multiplication number obtained by multiplying total number of synchronization signal pairs belonging to the group by the calculated corresponding correction rate, and calculates the first energy after correction and the number of signals allocated to the first energy after correction, for each of synchronization signal pairs belonging to the respective fourth, the fifth, and the sixth groups, the number of synchronization signal pairs being the multiplication number, on the basis of a magnitude relation among the first energy corresponding to the wave height of the first signal, the second energy corresponding to the wave height of the second signal synchronizing with the first signal, and the characteristic X-ray energy.

16. The radiation detection device according to claim 1, wherein the setting unit sequentially sets each of the detectors as the first detector to be corrected.

17. A radiation detection method performed by a radiation detection device that includes a scintillator layer configured to convert X-rays into scintillation light and a plurality of detectors arranged along a first surface facing the scintillator layer to detect the scintillation light, the method comprising:
randomly setting one detector from among the detectors as a first detector;
identifying, out of the detectors, one or more second detectors, each detecting a synchronization signal synchronizing with a first signal detected by the first detector; and
correcting an energy spectrum of the scintillation light detected by the first detector on the basis of one or more second signals, each serving as the synchronization signal synchronizing with each of one or more first signals in signals detected by each of the second detectors, the first signals, and characteristic X-ray energy of a scintillator raw material constituting the scintillator layer, wherein
the correcting includes:
calculating, for each synchronization signal pair of the first signal and a second signal synchronizing with the first signal in a plurality of synchronization signal pairs, on the basis of a magnitude relation among a first energy corresponding to a wave height of the first signal, a second energy corresponding to a wave height of the second signal, and the characteristic X-ray energy, the first energy that is corrected to be treated as a value after correction and the number of signals allocated to the corrected first energy when an energy spectrum is calculated, and
correcting the energy spectrum detected by the first detector using the corrected first energy corresponding to the first signal included in each of the synchronization signal pairs and the number of the signals, and
the identifying includes:
identifying, out of the detectors, a first group of the second detectors that detect synchronization signals synchronizing with the first signals detected by the first detector;
calculating proportions of the second signals detected by the respective second detectors belonging to the first group;
identifying a second group of the second detectors in each of which a reduction in proportion of the second signals is saturated, the proportions of the second signals being detected by the respective second detectors arranged in a direction apart from a location adjacent to the first detector being reduced; and
identifying the second detectors not belonging to the second group out of the second detectors belonging to the first group as the detectors used for correction of the first signals.

18. A computer program product comprising a non-transitory computer readable medium containing a program executed by a computer that includes a scintillator layer configured to convert X-rays into scintillation light and a plurality of detectors arranged along a first surface facing the scintillator layer to detect the scintillation light, the program causing the computer to execute:
randomly setting one detector from among the detectors as a first detector;
identifying, out of the detectors, one or more second detectors, each detecting a synchronization signal synchronizing with a first signal detected by the first detector; and
correcting an energy spectrum of the scintillation light detected by the first detector on the basis of one or more second signals, each serving as the synchronization signal synchronizing with each of one or more first signals in signals detected by each of the second detectors, the first signals, and characteristic X-ray energy of a scintillator raw material constituting the scintillator layer, wherein
the correcting includes:
calculating, for each synchronization signal pair of the first signal and a second signal synchronizing with the first signal in a plurality of synchronization signal pairs, on the basis of a magnitude relation among a first energy corresponding to a wave height of the first signal, a second energy corresponding to a wave height of the second signal, and the characteristic X-ray energy, the first energy that is corrected to be treated as a value after correction and the number of signals allocated to the corrected first energy when an energy spectrum is calculated, and
correcting the energy spectrum detected by the first detector using the corrected first energy corresponding to the first signal included in each of the synchronization signal pairs and the number of the signals, and
the identifying includes:

identifying, out of the detectors, a first group of the second detectors that detect synchronization signals synchronizing with the first signals detected by the first detector;
calculating proportions of the second signals detected by the respective second detectors belonging to the first group;
identifying a second group of the second detectors in each of which a reduction in proportion of the second signals is saturated, the proportions of the second signals being detected by the respective second detectors arranged in a direction apart from a location adjacent to the first detector being reduced; and
identifying the second detectors not belonging to the second group out of the second detectors belonging to the first group as the detectors used for correction of the first signals.

* * * * *